United States Patent
Shuman

(10) Patent No.: US 8,750,915 B2
(45) Date of Patent: Jun. 10, 2014

(54) EXCHANGE OF LOCATION INFORMATION USING A WIRELESS COMMUNICATION DEVICE

(75) Inventor: Mohammed Ataur Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 724 days.

(21) Appl. No.: 12/652,469

(22) Filed: Jan. 5, 2010

(65) Prior Publication Data

US 2011/0165905 A1 Jul. 7, 2011

(51) Int. Cl.
*H04M 3/42* (2006.01)
*H04B 7/00* (2006.01)
*H04M 1/00* (2006.01)

(52) U.S. Cl.
USPC .......... 455/519; 455/517; 455/416; 455/521; 455/518

(58) Field of Classification Search
USPC ........ 455/456.1, 456.2, 456.3, 517, 518, 519, 455/416
See application file for complete search history.

(56) References Cited

U.S. PATENT DOCUMENTS

| | | | | |
|---|---|---|---|---|
| 6,882,850 | B2 * | 4/2005 | McConnell et al. | 455/453 |
| 7,184,790 | B2 * | 2/2007 | Dorenbosch et al. | 455/519 |
| 7,633,914 | B2 * | 12/2009 | Shaffer et al. | 370/338 |
| 7,738,897 | B2 * | 6/2010 | Tillet et al. | 455/519 |
| 8,000,724 | B1 * | 8/2011 | Rayburn et al. | 455/456.3 |
| 8,010,142 | B2 * | 8/2011 | Wild et al. | 455/518 |
| 8,131,818 | B2 * | 3/2012 | Nielsen et al. | 709/217 |
| 2003/0186716 | A1 * | 10/2003 | Dorenbosch et al. | 455/519 |
| 2005/0288036 | A1 * | 12/2005 | Brewer et al. | 455/456.2 |
| 2006/0223518 | A1 * | 10/2006 | Haney | 455/420 |
| 2007/0037599 | A1 * | 2/2007 | Tillet et al. | 455/521 |
| 2008/0139187 | A1 * | 6/2008 | Subramanian | 455/416 |
| 2009/0024743 | A1 * | 1/2009 | Zhang et al. | 709/226 |
| 2012/0077536 | A1 * | 3/2012 | Goel et al. | 455/518 |

FOREIGN PATENT DOCUMENTS

| | | |
|---|---|---|
| JP | 2007150768 A | 6/2007 |
| JP | 2008182612 A | 8/2008 |
| JP | 2008538464 A | 10/2008 |
| KR | 100681285 B1 | 2/2007 |
| WO | WO0022872 A1 | 4/2000 |
| WO | 2007081047 A1 | 7/2007 |

OTHER PUBLICATIONS

International Search Report and Written Opinion—PCT/US2011/020260—ISA/EPO—Apr. 18, 2011.

* cited by examiner

*Primary Examiner* — Tilahun B Gesesse
(74) *Attorney, Agent, or Firm* — Michael F. Taveira

(57) ABSTRACT

Exemplary techniques for sending data packages that can include geographic information during group communication sessions between wireless telecommunication devices, such as push-to-talk communication sessions, are disclosed. In an embodiment the data packages are wirelessly transmitted by a communication device to a group communication server and then sent to other group members.

165 Claims, 13 Drawing Sheets

EXCHANGE OF LOCATION INFORMATION USING A WIRELESS COMMUNICATION DEVICE

BACKGROUND

The present invention generally relates to wireless telecommunication systems. More particularly, the present invention relates to techniques for sharing geographic coordinates between wireless communication devices.

In wireless communication devices, such as cellular phones, PDAs, mini-laptops, and advanced pagers, the devices typically communicate over long distances by bridging telephone calls through existing cellular telephone networks and passing data packets across the network. These wireless communication devices often have data processing and computing capabilities, and can accordingly send and receive software programs, in addition to voice, across the telephone network.

There exists a wireless telecommunication service that provides a quick one-to-one or one-to-many communication that is generically referred to as "Push-To-Talk" (PTT) capability. Generally speaking, the PTT system uses standard voice-over internet protocol (VoIP) technologies. Voice information is sent in digital form over IP-based data networks in discrete packets rather than traditional circuitry switched protocols such as those used in the public switched telephone network (PSTN). In PTT scenarios, instead of using the standard cellular infrastructure a call is formed by combining separate point-to-point connections between each IP endpoint in the network. Initiating the PTT system generates a call to the target device. The call originator's voice can be sent through the carrier's network to the target handset. The specific PTT group of recipient devices for the communicating wireless communication device is commonly set up by the carrier. A PTT communication connection is typically initiated by a single button-push on the wireless communication device that activates a half-duplex link between the speaker and each member device of the group and once the button is released, the device can receive incoming PTT transmissions. Existing PTT systems have advantages over traditional cellular systems because they have faster call setup times, e.g., setup times ideally in the range of 1 second as opposed to cellular voice channels that can take more than 5 seconds to establish. In some arrangements, the PTT speaker will have the "floor" where no other group member can speak while the speaker is speaking. Once the speaker releases the PTT button, any other individual member of the group can engage his or her PTT button and he or she will have the floor.

In existing PTT systems, member devices will only communicate voice data between the devices during a communication session, e.g., when a group communication channel is opened between member devices. It is difficult to include other data in the session because of the size of the data and the device resources necessary to handle non-voice data. The existing wireless communication devices therefore send non-voice data, such as data packages, through specific data channels established between the device and a wireless communication network.

Accordingly, it would be advantageous to provide a system and method for a wireless communication device to economically send data other than voice to others during a PTT or VoIP communication session.

SUMMARY

The present system and method provide techniques for sending geographic location information using a group communication server. An exemplary embodiment describes a system for communicating geographical location data to one or more wireless devices of members of a communication group on a wireless network, the system includes, but is not limited to, at least one requesting wireless device that is a member of a communicating group of a plurality of wireless devices, the at least one requesting wireless communication device selectively in communication with a wireless network and configured to request the geographical location of at least one other wireless device of a member of a communication group; and a group communication server that supports group communications between wireless devices of members of a communication group, the group communication configured to selectively receive at least the request for geographical location data from the requesting wireless communication device and obtain the geographical location data for at least one member of the communication group, and transmit the geographical location data to the requesting wireless device. In addition to the foregoing, other aspects are described in the claims, drawings, and text forming a part of the present disclosure.

In another embodiment a group communication server method is provided that includes, but is not limited to storing, in memory, geographic coordinate information for a first wireless devices; receiving, from a second wireless device, a group communication channel setup request, the request including information that identifies the second wireless device; and sending geographic coordinates information for the second wireless device to the first wireless device. In addition to the foregoing, other aspects are described in the claims, drawings, and text forming a part of the present disclosure.

In another embodiment a group communication server method is provided that includes, but is not limited to receiving a group communication channel setup request from an originating device; sending a group communication channel setup request to a target device, the group communication channel setup request including a request for geographic coordinates indicative of the location of the target device; and receiving a group communication channel acknowledgement signal from the target device, the acknowledgment signal including the geographic coordinates indicative of the location of the target device. In addition to the foregoing, other aspects are described in the claims, drawings, and text forming a part of the present disclosure.

In another embodiment a group communication server method is provided that includes, but is not limited to establishing a group communication channel between a target wireless device and an originating wireless device; receiving geographic coordinates indicative of the location of the target device via the group communication channel; and sending the geographic coordinates indicative of the location of the target device to the originating wireless device via the group communication channel. In addition to the foregoing, other aspects are described in the claims, drawings, and text forming a part of the present disclosure.

In another embodiment a group communication server method is provided that includes, but is not limited to establishing a group communication channel between a target wireless device and an originating wireless device; receiving geographic coordinates indicative of the location of the originating wireless device via the group communication channel; and sending the geographic coordinates indicative of the location of the wireless device to the target wireless device via the group communication channel. In addition to the foregoing, other aspects are described in the claims, drawings, and text forming a part of the present disclosure.

In another embodiment a group communication server method is provided that includes, but is not limited to storing geographic coordinates indicative of the location of the wireless device; sending, via a wireless signal, a group communications channel setup request to a group communication server, the request including information that identifies a target device and the geographic coordinates; and receiving a signal indicating that the group communications channel has been established. In addition to the foregoing, other aspects are described in the claims, drawings, and text forming a part of the present disclosure.

In another embodiment a group communication server method is provided that includes, but is not limited to sending a request for a group communications channel to a group communication server, the request including information that identifies a target wireless device; and receiving, via an established group communications channel, geographic coordinates indicative of the location of the target wireless device from the group communication server. In addition to the foregoing, other aspects are described in the claims, drawings, and text forming a part of the present disclosure.

In another embodiment a group communication server method is provided that includes, but is not limited to maintaining a group communications channel established between a wireless device and a remote wireless device; receiving geographic coordinates indicative of the location of the remote wireless device; and displaying the geographic coordinates. In addition to the foregoing, other aspects are described in the claims, drawings, and text forming a part of the present disclosure.

In another embodiment a group communication server method is provided that includes, but is not limited to sending, by the wireless device, a signal that grants a specific remote wireless device access to the geographic coordinates indicative of the location of the wireless device via a group communication channel opened between the wireless device and the specific remote wireless device; and sending, from a wireless device, geographic coordinates indicative of the location of the wireless device to a group communication server that is configured to selectively grant access to the geographic coordinates indicative of the location of the wireless device during a group communication session. In addition to the foregoing, other aspects are described in the claims, drawings, and text forming a part of the present disclosure.

The present system and method are therefore advantageous in that they allow a wireless communication device to economically send data packages and other data packages to others during a PTT communication session. Furthermore, the method of queuing and forwards bundles of data packages can also be performed at the group communication server if the system is so embodied. The system and method thus have industrial applicability as they can be implemented on a group communication system in order to provide location information during group communication sessions. The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
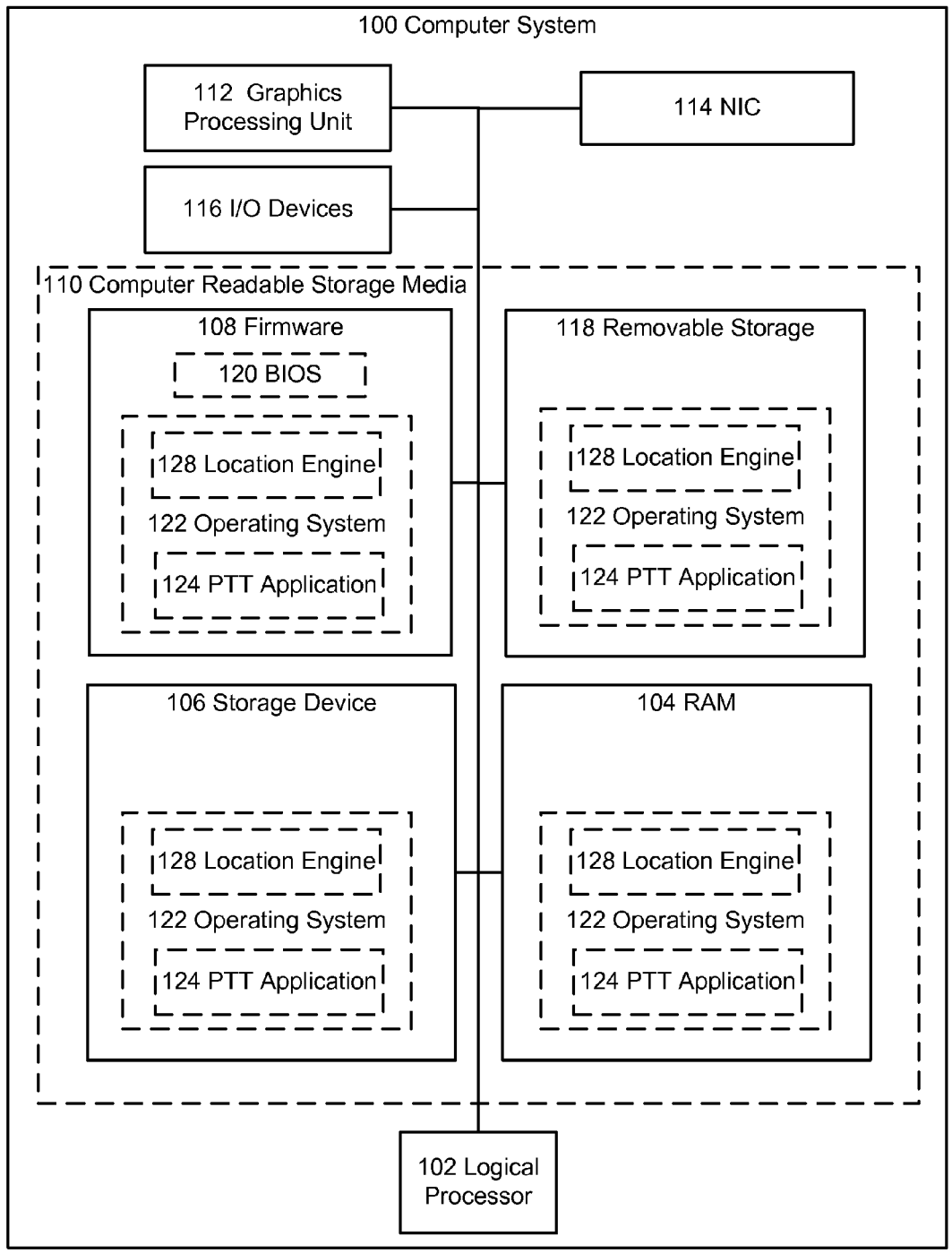
FIG. 1 describes an example environment for practicing aspects of the present disclosure.

In this disclosure, the terms 'communication device,' 'wireless telephone,' 'wireless communications device,' 'PTT communication device,' 'handheld device,' 'wireless communication device,' and 'handset' are used interchangeably. The terms 'call' and 'communication' are also used interchangeably. The term 'group communication' is intended to encompass a half duplex, or virtual half-duplex communication channel used for one-to-many communications, such as push-to-talk half duplex communications, but can also embrace one-to-one communication where there are two only two group members present and communicating. The term 'exemplary' means that the disclosed element or embodiment is only an example, and does not indicate any preference of use. Further, like numerals refer to like elements throughout the several drawings, and the articles "a" and "the" include plural references, unless otherwise specified in the description. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The term circuitry used throughout the disclosure can include hardware components such as application specific integrated circuits, hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, etc. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is insignificant to this disclosure and left to an implementer.

Embodiments may execute on one or more computers. FIG. 1 and the following discussion are intended to provide a brief general description of a suitable computing environment in which the disclosure may be implemented. One skilled in the art can appreciate that computer systems disclosed herein can have some or all of the components described with respect to computer 100 of FIG. 1.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by a system bus which couples various system components to the logical processor 102. The system bus may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., a electromechanical hard drive, a solid state hard drive, etc., firmware 108, e.g., FLASH RAM or ROM, and removable storage 118 such as, for example, CD-ROMs, floppy disks, DVDs, FLASH drives, external storage devices, etc. It should be appreciated by those skilled in the art that other types of computer readable storage media can be used to store data, such as magnetic cassettes, flash memory cards, digital video disks, Bernoulli cartridges, etc.

The computer readable storage media 110 provide storage of computer readable instructions, data structures, program modules and other data for the computer 100. A basic input/output system (BIOS) 120, containing the basic routines that help to transfer information between elements within the computer system 100, such as during start up, can be stored in firmware 108. A number of applications 124 and an operating system 122 may be stored on firmware 108, storage device 106, RAM 104, and/or removable storage devices 118, and executed by logical processor 102.

Commands and information may be received by computer 100 through input devices 116 which can include, but are not limited to, keyboards and pointing devices. Other input devices may include microphones, joysticks, game pads, scanners or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114 (NIC). The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
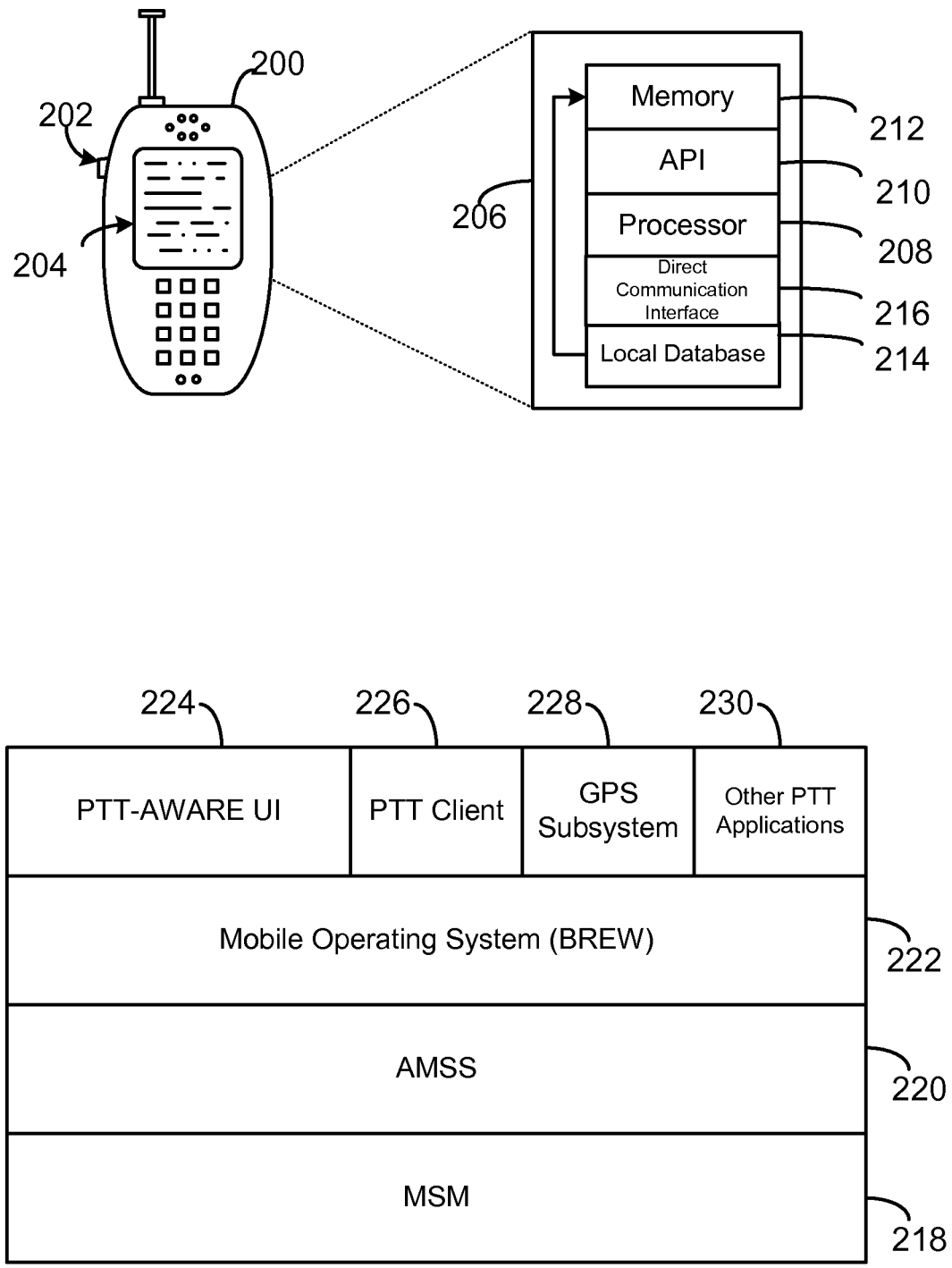
FIG. 2 depicts an example wireless communication device.

Referring now to FIG. 2, it illustrates an example wireless telecommunication device that can be a wireless communication device 200 with a PTT button 202 that opens the direct communication to a target device, e.g., an endpoint associated with an IP address. The wireless communication device 200 is also shown as having a graphics display 204. The wireless communication device 200 can include a computer platform 206 that can handle voice and data packets, execute software applications, and transmit information across a wireless network. The computer platform 206 includes, among other components, at least one processor 208 such as an application-specific integrated circuit ("ASIC") or a RISC processor such as those that implement the ARM architecture. The processor 208 is installed at the time of manufacture of the wireless communication device 200 and is not normally upgradeable. The wireless communication device can include a GPS chipset (not shown) that can generate geographic information indicative of the location of the wireless communication device. The processor 208 or other microprocessor can execute an application programming interface ("API") layer 210, which can include an operating system which can control the hardware of the mobile device. An example of an operating system is the "binary runtime environment for wireless" (BREW) software developed by QUALCOMM® for wireless communication device platforms.

As shown here, the wireless communication device 200 can be a wireless communication telephone, with a graphics display 204, but can also be any wireless device with a computer platform 206 as known in the art, such as a personal digital assistant (PDA), a pager with a graphics display 204, or even a separate computer platform 206 that has a wireless communication portal, and may otherwise have a wired connection to a network or the Internet. Further, memory 212 can be comprised of read-only or random-access memory (RAM and ROM), EPROM, EEPROM, flash cards, or any memory common to computer platforms. The computer platform 206 can also include a local database 214 for storage of software applications not actively used in memory 212. The local database 214 is typically comprised of one or more flash memory cells, but can be any secondary or tertiary storage device as known in the art, such as magnetic media, EPROM, EEPROM, optical media, tape, or soft or hard disk. The graphics display 204 can present not only information about the ongoing group call, but can also display geographic coordinates on a map as described in more detail in the following paragraphs.

Figure 3:
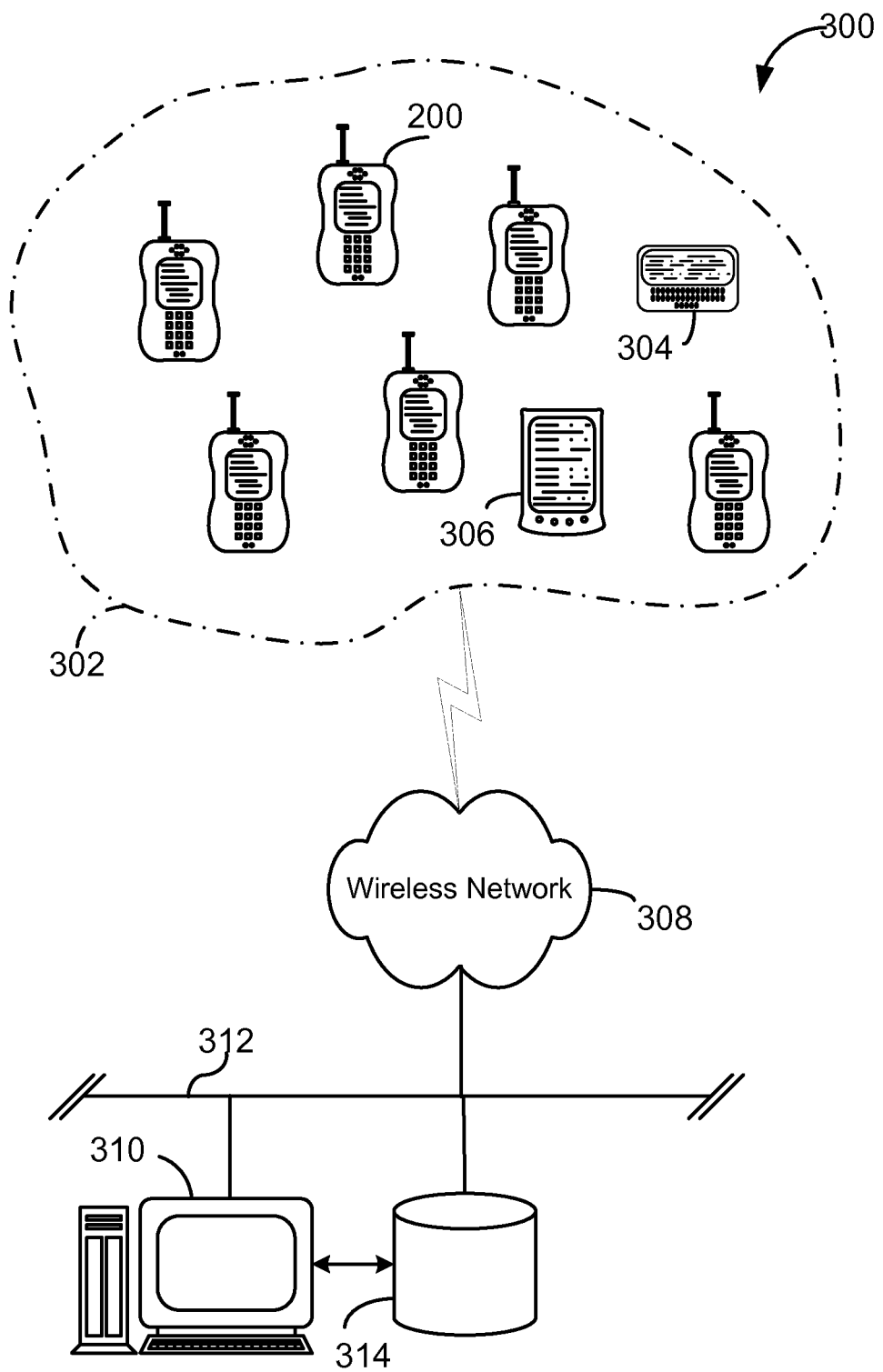
FIG. 3 depicts an example system for sharing data packages.

The computer platform 206 can also include a direct communication interface 216 that can open a direct communication channel with an endpoint such as a group communication server of FIG. 3. The direct communication interface 216 can also be part of the standard communication interface for the wireless communication device 200 which ordinarily carries the voice and data transmitted to and from the wireless communication device 200. The direct communication interface 216 typically is comprised of hardware as is known in the art.

Continuing with the description of FIG. 2, additionally depicted is a diagram of an embodiment of the software layers of the group application client that can include, but is not limited to, PTT functionality and GPS coordinate sharing functionality. In an embodiment, the computer platform 206 in the wireless communication device environment can include a series of software "layers" developed on top of the Mobile Station Modem (MSM) 218 and the Advanced Mobile Subscriber Software (AMSS) 220, developed by QUALCOMM®. In this example the underlying MSM chipset can implement the software protocol stack for the entire suite of CDMA communication technologies that include CDMA2000 1X and CDMA2000 1xEV-DO. In this example the AMSS 220 can be configured to support a mobile operating system layer 222, which in an embodiment is BREW®, also developed by QUALCOMM®. The mobile operating system layer 222 can provide an application programming interface for chip or device-specific operations, while providing an isolation layer that eliminates direct contact to the AMSS 220 and any OEM software on the mobile device 200. The mobile operating system layer 222 can enable application development that uses wireless communication device features without having to rewrite the application each time a new release of the device-specific software is released.

In this example the mobile operating system 222 can support a PTT client 226 that is configured to offer access to PTT services through an external interface, here shown at a PTT-aware UI 224. The PTT client 226 can include all the functions required to enable mobile operating system applications, such as the GPS subsystem 228. In an embodiment, the PTT client 226 can maintain access to PTT services, respond to communication requests, process all PTT-aware mobile operating system applications requests for PTT services, process all outgoing PTT requests, collect and package vocoder packets for originating PTT talk spurts, and parse packets of vocoder data for terminated PTT talk spurts.

The GPS subsystem 228 can be a mobile operating system-based application that extends PTT services for access to a GPS service. The GPS subsystem 228 can provide access to GPS services through an external interface such as a GPS aware API that is an application that may be developed entirely as a mobile operating system-based application or used in combination with an AMSS 220 interface. The GPS subsystem 228 can additionally be configured to handle incoming GPS coordinates and/or requests from the group communication server 310 for coordinates as described in more detail below. Other push-to-talk applications 230 or applications than can receive and transmit data across the group communication channel can also be resident on the platform.

FIG. 3 illustrates an example embodiment of a system 300 for sharing GPS coordinates among one or more wireless telecommunication devices in a PTT group 302, such as the wireless communication device 200, smart pager 304 and personal digital assistant (PDA) 306, with other wireless communication devices. In the system 300, each wireless telecommunication device 200, 302, and 306 can be capable of selectively directly communicating across the wireless communication network 308 with a target set of one or more other wireless telecommunication devices. For example, the target set for wireless communication telephone 200 can be all devices in the communication group 302 or a subset thereof, such as pager 304 and PDA 306.

In an embodiment, the wireless telecommunication device (such as wireless communication telephone 200) can send a flag to at least the group communication server 310, e.g., one or more computers that can have components similar to computer 100 of FIG. 1, which is present on a server-side LAN 312 across the wireless network 308. The flag in this example can be used by the server to determine that the wireless device is present, i.e. accessible, on the wireless network 308. The group communication server 310 can share this information with a set of target wireless telecommunication devices designated by the first wireless telecommunication device or it can also share this with other computer devices resident on the server-side LAN 312 or accessible across the wireless network 308. The group communication server 310 can have an attached or accessible database 314 to store the group identification data for the wireless devices and for example, GPS coordinates of the various devices operating in the wireless network 308. It should be appreciated that the number of computer components resident on server-side LAN 312, or across the wireless network 308, or Internet generally, are not limited.

The group communication server 310 can establish point to point IP PTT channels between devices in the group 302. A PTT channel can be established through a half-duplex channel (true or virtual) between the communicating wireless telecommunication device 200, 304, and/or 306 and the one or more other wireless telecommunication devices of the target set. Also, the group communication server 310 can attempt to bridge the requested direct communication with the target set if at least one of the wireless telecommunication devices of the target set have informed the group communication server 310 of their presence on the wireless network 308.

The group communication server 310 can also inform the wireless telecommunication device 200, 304, and 306 of the inability to bridge a direct communication to the target set 302 upon none of the wireless telecommunication devices (or at least one) of the target set not having informed the group communication server 310 of their presence on the wireless network 308. Further, while the communication server 310 is shown here as having the attached database 314 of group identification data, the group communication server 310 can have group identity data resident thereupon, and perform all storage functions described herein.

The group communication server 310 can also be configured to store GPS coordinates indicative of the location of the wireless devices in the target set 302. For example, the group communication server 310 can store GPS coordinates in persistent storage, e.g., database 314, or the GPS coordinates can be temporarily stored in RAM as GPS coordinates flow from one wireless device to another. In various embodiments the group communication server 310 can selectively obtain, e.g., by retrieving from memory or by receiving from the wireless devices, GPS coordinates and selectively send the coordinates to other wireless devices of the group 302.

In overview, the system 300 can include at least one wireless communication device, such as wireless communication telephone 200, that can be a member of a communication group 302 of wireless communication devices. The wireless communication devices in this example can be configured to communicate with each other or communicate as a group across a wireless communication network 308. In addition, at least one of the wireless communication devices can be configured to selectively send data packages to other members of the communication group 302. At least one group communication server 310 is configured to store information on communication groups 302 on the wireless communication network 308, the information including the identity of the specific member wireless communication devices of one or more communication groups. The group communication server 310 can be further configured to selectively receive GPS coordinates from a sending wireless communication device, such as wireless communication telephone 200, of a communication group 302, store the GPS coordinates, and/or send the GPS coordinates to other members of the PTT group 302.

The wireless communication device 200, 304, 306 can send communication group identification data to the group communication server 310 at the time of sending GPS coordinates, e.g. a target list, and thus, the database 314 can be configured to send or store the GPS coordinates to or for the member wireless communication devices identified in the communication group identification data based upon a variety of criteria as is further discussed herein. Alternately, prior to the wireless communication device sending data packages, the wireless communication device 200, 304, and 306 can request member data for a communication group 302 from the group communication server 310, and the server 310 can send one or more addresses or communication group addresses to the wireless communication device 200, 304, and 306. In one embodiment, the group communication server 310 can filter the potential communication groups available based upon their member devices' capability to receive GPS coordinates.

As is further described herein, the wireless communication device 200, 304, and 306 can be engaged in a group communication with the member wireless communication devices of the communication group 302, and send data packages during the group communication in the same communication session, or independently therefrom. Alternately, the data packages can be sent independently of the group-communication session.

Figure 4:
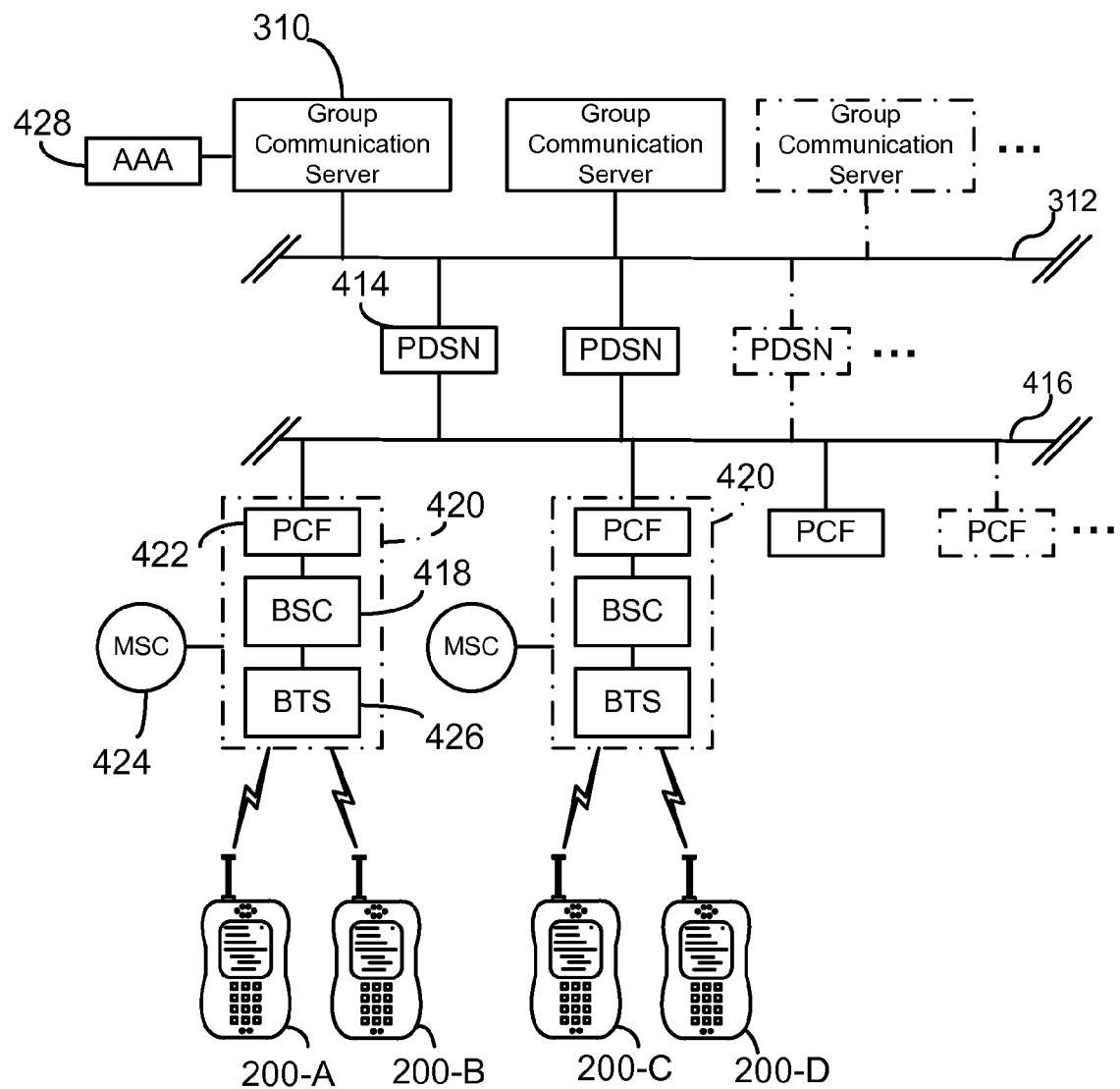
FIG. 4 shows an example wireless network.

FIG. 4 shows an exemplary wireless network in a common cellular telecommunication configuration. The wireless network in this example can include a series of communication servers 310 that control communications between the wireless communication devices of set group members (devices 200-A through D) in a PTT system. The wireless network is merely exemplary and can include any system whereby remote modules communicate over-the-air between and among each other and/or between and among components of a wireless network, including, without limitation, wireless network carriers and/or servers. A series of communication servers 310 are connected to a group communication server LAN 312. Wireless telephones can request packet data sessions from the group communication server(s) 310 using a data service option.

Continuing with the description of FIG. 4, each group communication server(s) 310 can be coupled to an authentication, authorization, and accounting server "AAA" 428 to authenticate the wireless communication devices 200, 304, and/or 306. The AAA 428 can be coupled to a database operable to store information such as user accounts and privileges. In this example the group communication server(s) 310 can be connected to a wireless service provider's packet data service node (PDSN) such as PDSN 414, shown here resident on a carrier network 416. Each PDSN 414 can interface with a base station controller 418 of a base station 420 through a packet control function (PCF) 422. The wireless network 308 can control messages (generally in the form of data packets) sent to a messaging service controller ("MSC") 424. The carrier network 308 in this example can communicate with the MSC 424 by a network, the Internet and/or POTS ("plain ordinary telephone system"). Typically, the network or Internet connection between the wireless network 308 and the MSC 424 transfers data, and the POTS transfers voice information. The MSC 424 can be connected to one or more base stations 420. In a similar manner to the carrier network, the MSC 424 is typically connected to the branch-to-source (BTS) 426 by both the network and/or Internet for data transfer and POTS for voice information. The BTS 426 ultimately broadcasts and receives messages wirelessly to and from the wireless devices, such as cellular telephones 200-A through D, by short messaging service ("SMS"), or other over-the-air methods known in the art. It should also be noted that carrier boundaries and/or PTT operator network boundaries do not inhibit or prohibit the sharing of data as described herein.

Cellular telephones and wireless communication telecommunication devices, such as wireless telephone 200, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 200, can download many types of "data packages," which are discrete segments of computer code, such as applications, web pages, applets, MIDlets, multi-media, picture, games and simple data. In wireless devices that have designated a group communication group 302 (such as depicted by FIG. 3), the wireless communication device can directly connect with the other member of the set and engage in voice and data communication. However, such direct group communications will occur through, or at the control of, the group communication server 310. All data packets of the devices do not necessarily have to travel through the group communication server 310 itself, but the group communication server 310 must be able to ultimately control the communication because it will typically be the only server-side component that is aware of and/or can retrieve the identity of the members of the communication group, or direct the identity of the members of the communication group 302 to another computer device.

The following are a series of flowcharts depicting operational procedures. The flowcharts are organized such that the initial flowcharts present implementations via an overall viewpoint. Those having skill in the art can appreciate that the style of presentation utilized herein, e.g., beginning with a presentation of a flowchart(s) presenting an overall view and thereafter providing additions to and/or further details in subsequent flowcharts, generally allows for a rapid and easy understanding of the various operational procedures.

Figure 5:
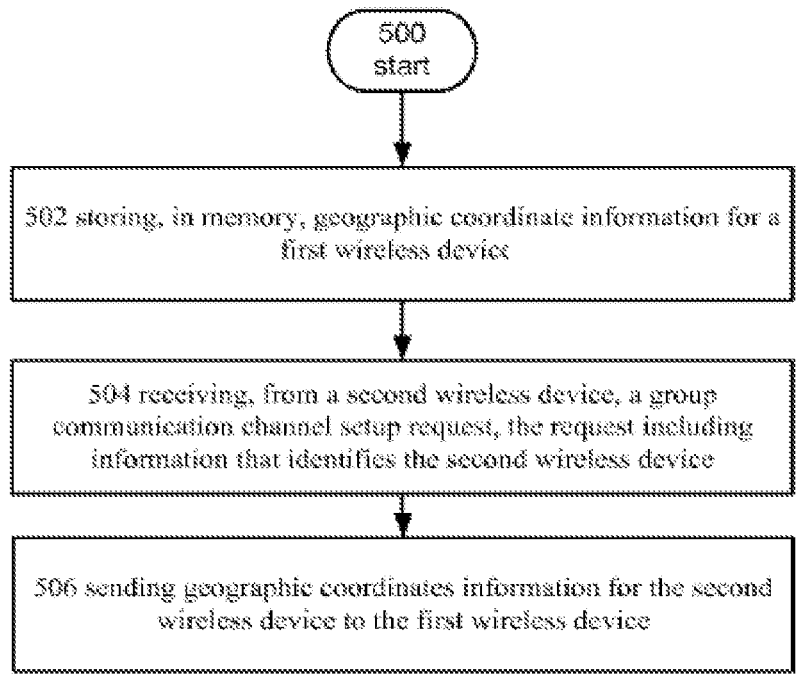
FIG. 5 illustrates an example operational procedure 500.

Turning now to FIG. 5, it illustrates an operational procedure 500 including operations 500, 502, 504, and 506. Operation 500 begins the operational procedure and operation 502 depicts storing, in memory, geographic coordinate information for a first wireless device. For example, and referring to FIG. 3, depicted is a group communication server 310 that can include components similar to those of FIG. 1, e.g., a logical processor 102, ram 104, etc. In this example logical processor 102 can execute a PTT application 124 and a location engine 128 that supports the distribution of geographic coordinates during PTT sessions. The location engine 128 can be executed and geographic coordinates of wireless devices in, for example, a PTT group 302 can be stored in computer readable media 110. In an example embodiment the geographic coordinate information can include GPS coordinates, A-GPS coordinates, or information that can be used to generate coordinates. As used herein, GPS coordinates and A-GPS coordinates can be jointly referred to as GPS coordinates for ease of understanding. The GPS coordinates can be determined by a global positioning system (GPS) of satellites that transmits signals that allow GPS receivers to determine their location, their velocity, and the current time. Assisted GPS (A-GPS) is a technology used by mobile devices to improve the reliability of GPS in environments that have poor signal conditions. An A-GPS receiver can improve reliability over a GPS system by using assistance from a mobile network that can acquire satellite information and perform calculations on behalf of the mobile device.

Continuing with the description of FIG. 5, operation 504 depicts receiving, from a second wireless device, a group communication channel setup request, the request including information that identifies the second wireless device. For example, a network adaptor 114 of the group communication server 310 can receive a group communication channel setup request, e.g., a message. For example, and referring to FIG. 4, the user of the device 200-A may determine that they want to have a PTT conversation with a user of a target device 200-B and request a push to talk session. The call setup request can contain, for instance, the target device's address. The call setup request may also be sent with a DataOverSignaling Access channel message. The network adaptor 114 can process the request and send an interrupt to the processor 102 indicating that a new message has been received. The processor 102 can run the PTT server application 124 and process the group communication request.

In a specific embodiment the call setup request message can be embodied in a session initiation protocol (SIP) message. The message can include XML for example that identifies the mobile device, e.g., telephone number, mobile subscriber identifier, username/password, for authorization purposes and information that identifies the second wireless device, e.g., a telephone number of the second wireless device, an IP address, etc.

Continuing with the description of FIG. 5, operation 506 depicts sending geographic coordinates information for the second wireless device to the first wireless device. For example, and referring to FIG. 4, geographic coordinates information, e.g., GPS coordinates or information that can be processed by the first device to determine the position of the second device (device 200-B), can be sent from the group communication server 310 to the first device, e.g., device 200-A. For example, processor 102 of the group communication server 310 can execute the location engine 128 that supports the distribution of geographic coordinates during PTT sessions and the geographic coordinates stored in memory can be sent to the originating device. For example, the location engine 128 can run and receive information that identifies the second wireless device. The location engine 128 can then search database 314 for geographic information for the second wireless device. The location engine 128 can pass the geographic information to the PTT application which can send the information to the first wireless device.

In an embodiment the group communication server 310 can send the geographic coordinate information in a message that identifies that the channel was opened. For example, in one specific example the group communication server 310 can assign the session an identifier and send an INVITE message to the wireless device 200-A indicating that the channel has been opened and information that identifies a floor control identifier. In this example the geographic coordinate information can be embedded within the INVITE message and sent to the wireless device 200-A for example.

In an embodiment where a PTT session is established between many wireless devices, e.g., multiple targets, the geographic coordinates for each target can be sent to the originating device. In this example an operator of an originating device can quickly determine where each target is located.

Figure 6:
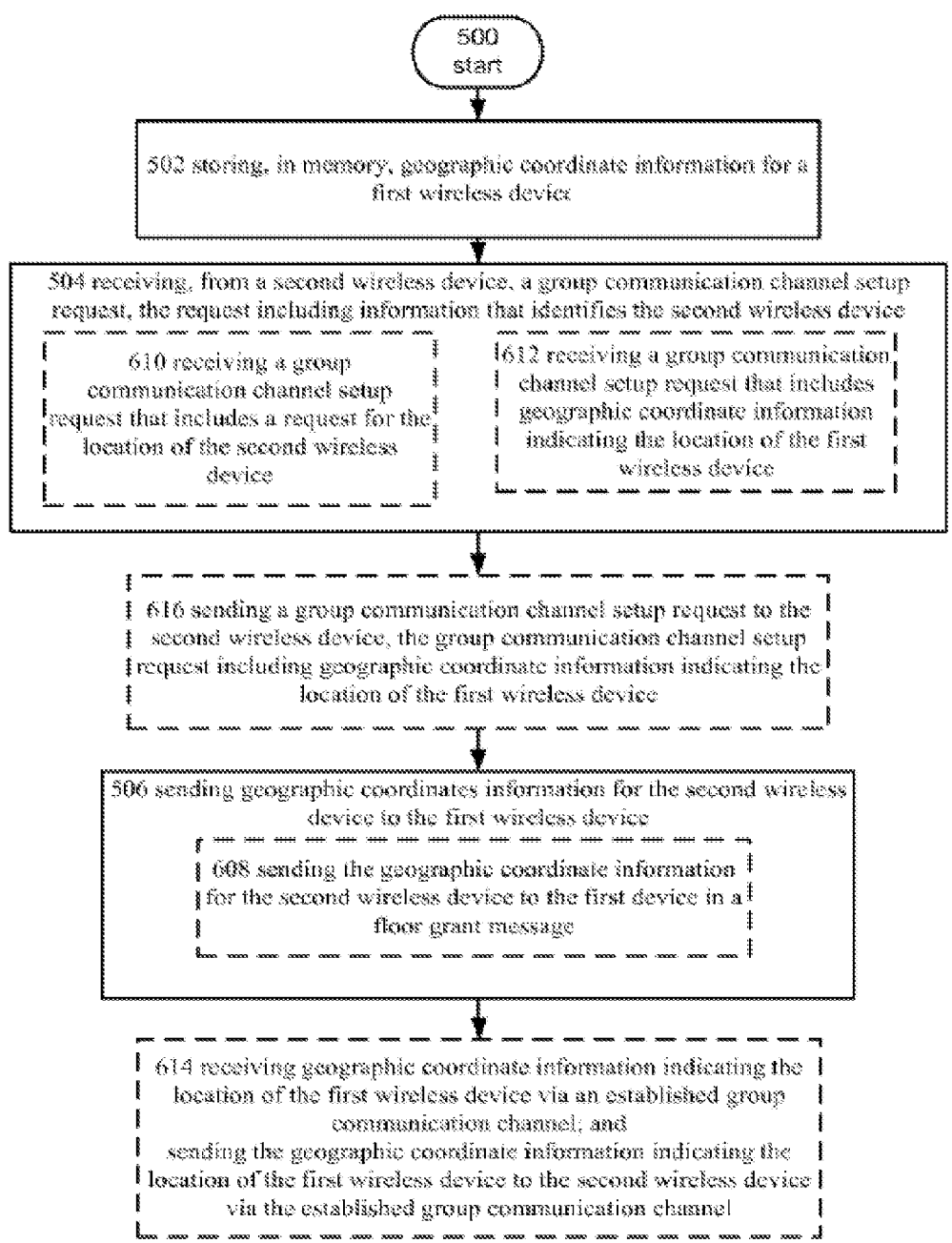
FIG. 6 illustrates an alternative embodiment of the operational procedure of FIG. 5.

Turning now to FIG. 6, it illustrates an alternative embodiment of the operational procedure of FIG. 5 including additional operations 608-616. As illustrated by the figure, operation 608 shows that in an embodiment sending geographic coordinate information for the second wireless device to the first wireless device can include sending the geographic coordinate information for the second wireless device to the first device in a floor grant message. For example, as stated above, the device that has the floor can use the group communication channel to send data to the group communication server 310. The PTT application 124 of the group communication server 310 can be executed to insure that only one device has the floor at any given time by implementing a floor control protocol. The protocol can include methods for notifying devices that no device controls the floor, notifying devices that a device has released the floor, receiving floor requests, notifying devices that a device has been granted the floor, etc. In this example embodiment the PTT application 124 can receive information that GPS coordinates are to be shared during certain floor control messages. In this instance, when a floor grant message is sent to devices it can include the GPS coordinate of the second device 200-B. The processor 102 of the server can run the PTT application 124 that can obtain location information from the location engine 128. The PTT application can then generate a floor grant message, e.g., a SIP message, that includes GPS coordinates and send the message to the first device 200-A Continuing with the description of FIG. 6, operation 610 shows that in an embodiment receiving the group communication channel setup request can include receiving a group communication channel setup request that includes a request for the location of the second wireless device. For example, in an embodiment the network adaptor 114 of the group communication server 310 can receive a setup request message that includes a request for the target's geographic coordinates. Similar to that described above, the setup request message can be embodied in a message. When the PTT button is pressed the processor 208 can be interrupted and directed to execute the PTT-client 226. The PTT-client 226 can configure the processor 102 to generate a message addressed to the group communication server 310. The message can include XML for example that identifies the mobile device, e.g., telephone number, mobile subscriber identifier, username/password, for authorization purposes, the identity of the second wireless device, and a request for GPS coordinates.

Continuing with the description of operation 612, it shows that in an embodiment receiving the group communication channel setup request can include, but is not limited to receiving a group communication channel setup request that includes geographic coordinate information indicating the location of the first wireless device. For example, in an embodiment the group communication channel setup request message can include the first wireless device's coordinates. For example, the GPS subsystem 228 of the device can obtain the GPS coordinates from, for example, a GPS chipset and make the coordinates available to a PTT aware UI 226. When the PTT button 202 is pressed the processor 208 can be interrupted and directed to execute the PTT-client 226. The PTT-client 226 can obtain the coordinates and configure the processor 102 to generate a message addressed to the group communication server 310. The message can include XML for example that identifies the mobile device, e.g., telephone number, mobile subscriber identifier, username/password, for authorization purposes, the identity of the second wireless device, and GPS coordinates indicative of the location of the first wireless device.

Turning to operation 614, it illustrates receiving geographic coordinate information indicating the location of the first wireless device via an established group communication channel; and sending the geographic coordinate information indicating the location of the first wireless device to the second wireless device via the established group communication channel. For example, in an embodiment a PTT communication channel can be established between the first and second device (device 200-A and 200-B). In this example embodiment the network adaptor 114 of the group communication server 310 can receive geographic coordinate information for the originating device and send the geographic coordinate information to the target via the established PTT channel. In this example the group communication server 310 can encode the geographic coordinates into one or more packets and send the packets to the second device.

In a specific embodiment the geographic coordinate information can be sent while the first device has the floor. For example, a user of the first device can request the floor. A floor grant message can be received by the first device and the GPS coordinates can be sent to the group communication server 310 during the next talk burst sent by the first device. That is, in this example GPS coordinates may be sent using a single floor control mechanism that is used for both the PTT call and the sharing of GPS information. The GPS subsystem 228 in this example request that the PTT client 226 add GPS coordinates to the existing PTT call. The add-GPS request can contain an indication that the data is to be shared using the same floor control mechanism as the PTT Client 226. The PTT Client 226 can then send the GPS coordinates during the next talk burst to the group communication server 310. Once the server 310 receives the coordinates they can be sent to the target device and/or stored in the server 310.

In another specific example the GPS coordinates can be sent using a different floor control mechanism than the one used for the PTT call. In this example the GPS coordinates are sent independently from the voice data over another PTT channel. For example, in an embodiment the mobile device 200 can send a request to the group communication server 310 to obtain an additional group communication channel in order to share, for example, GPS coordinates. In this scenario, a group communication channel can be opened between the first and second wireless device and the first wireless device can receive a request via the PTT aware UI 224 indicating that GPS coordinates are to be shared. In this example the coordinates can be shared using a separate floor control mechanism than the PTT call, i.e. independent of the floor control mechanism being used for the PTT call, and send a request to the PTT client 226 to add a new channel. A new channel can be assigned by the group communication server 310 and a signal can be sent to the target device. The PTT client 226 of the target can receive the signal and assign a new port for sending or receiving GPS coordinates and then send the new port identifier in an acknowledgement to the group communication server 310. After the new channel is successfully added to the PTT call the originator can request the floor, e.g., access to the half-duplex channel, to send GPS coordinates. The GPS client 228 can be configured to notify the PTT client 226 that GPS coordinates have been added and the PTT client can send a PTT floor request to the group communication server that include the floor identifier assigned to the additional channel. The group communication server 310 can verify that the floor for the additional channel is available prior to granting the floor request. The PTT client 226 can receive a signal indicating that the floor was granted and then the transceiver of the originator can send GPS coordinates to the server. Once the server 310 receives the coordinates, they can be sent to the target device and/or stored in the server.

Continuing with the description of FIG. 6, operation 616 illustrates sending a group communication channel setup request to the second wireless device, the group communication channel setup request including geographic coordinate information indicating the location of the first wireless device. For example, in an embodiment the group communication server 310 can execute the PTT application 124 and a network adaptor 114 can be configured to send a communication channel setup request to the second wireless device 200-B. In this example the communication channel setup request message can include geographic coordinates of the first wireless device 200-A and a request to assign a port to service a PTT session. In a PTT example, the group communication server 310 can locate the target by looking up the IP address associated with the target and discovering which base station 420 has last serviced the wireless device 200-8 associated with the IP address. The group communication server 310 can send a message to the base station 420 and the base station 420 can send a message via a control channel to the second wireless device 200-B. The PTT client 226 of the second wireless device can receive the signal and assign a new port for the PTT session and then send the new port identifier in an acknowledgement to the group communication server 310. In this example the PTT client 226 of the second wireless device 200-B can receive the message and parse the message to discover the geographic coordinates.

Figure 7:
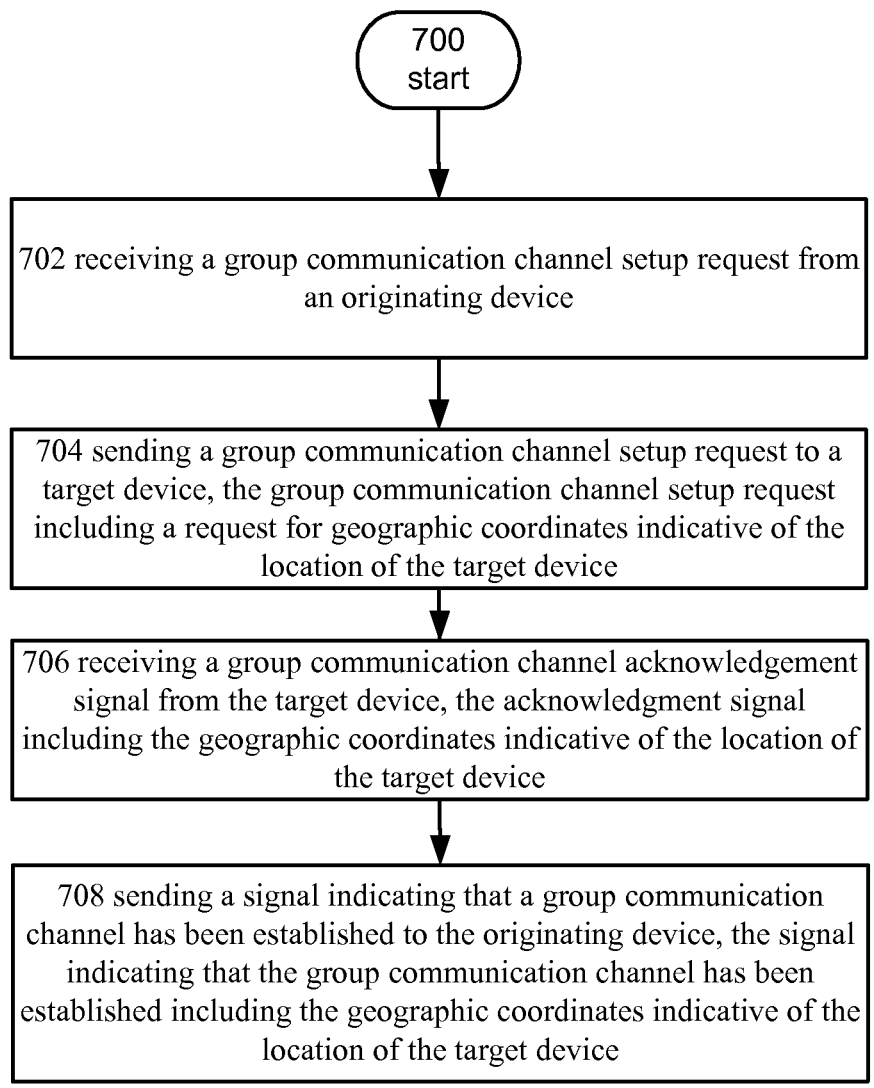
FIG. 7 illustrates an example operational procedure 500.

Turning now to FIG. 7, it illustrates an operational procedure for practicing aspects of the present disclosure including operations 700, 702, 704, 706, and 708. Operation 700 begins the operational procedure and operation 702 illustrates receiving a group communication channel setup request from an originating device. For example, a network adaptor 114 of the group communication server 310 can receive a group communication channel setup request message. For example the user of the device 200 may determine that they want to have a PTT conversation with a user of a target device, e.g., device 304 of FIG. 3, and request a push to talk session. The call setup request message can contain, for instance, the target device's address. The call setup request may also be sent with a DataOverSignaling Access channel message. The network adaptor 114 can process the request and send an interrupt to the processor 102 indicating that a new message has been received. The processor 102 can run the PTT server application 124 and process the group communication request.

Continuing with the description of FIG. 7, operation 704 shows sending a group communication channel setup request to a target device, the group communication channel setup request including a request for geographic coordinates indicative of the location of the target device. Continuing with the example, the group communication server 310 can receive the request message and send a call setup request message to the target device. For example, the group communication server 310 can include circuitry, e.g., processor(s) configured by the PTT application 124, configured to determine where in the network the target device is located. The group communication server 310 can receive the information and can route a call setup message to the base station controller 418 currently servicing the target device. The base station controller 418 can then wirelessly send a call setup request message to the target device over a control channel directing the target device to assign a port to service the PTT session. The target device can be configured to, for example, enter into a PTT session or deny the request in response to user input or timeout. In this example the message can include the request for the target's GPS coordinates. In a specific embodiment message sent to the target can be a SIP invitation message. The message can include XML that identifies the originating device, e.g., telephone number, and a request for GPS coordinates.

Turning to operation 706 it depicts receiving a group communication channel acknowledgement signal from the target device, the acknowledgment signal including the geographic coordinates indicative of the location of the target device. Continuing with the example, a network adaptor 114 of the group communication server 310 can receive an ACK message that acknowledges that the target is willing to enter into a PTT session. The message can include the geographic coordinates. The PTT application 124 can be run and the geographic coordinates can be sent to the location engine 128 which can store the coordinates in a database 314. In an embodiment the target device can generate the ACK message which can include the GPS coordinates of the target device. For example, a SIP ACK message can be sent from the target device that can include an XML field that has the GPS coordinates. For example, when the call setup request message is received by the target the PTT aware UI 224 can be executed by processor 208 and a user interface can display an option to enter into a PTT session, an option to enter into a PTT session and share GPS coordinates, and/or an option to deny the request to enter into the PTT session. In the instance where the target device receives the request to enter into the PTT session and share GPS coordinates, the PTT client 226 can obtain GPS coordinates generated by a GPS chipset and embed the coordinates in the invite accept message. In this example the message can include the GPS coordinates and the coordinates can be received by and, for example, stored in memory of the group communication server 310.

Continuing with the description of FIG. 7, operation 708 shows sending a signal indicating that a group communication channel has been established to the originating device, the signal indicating that the group communication channel has been established including the geographic coordinates indicative of the location of the target device. Continuing with the example, the group communication server 310 can send can the geographic coordinates in a message that identifies that the channel was opened. For example, in one specific example the group communication server 310 can assign the session an identifier and send an INVITE message to the wireless device 200 indicating that the channel has been opened and information that identifies a floor control identifier. In this example the geographic coordinates can be embedded within the INVITE message and send to the wireless device 200. For example, the PTT application 124 can send a request for the geographic coordinates to the location engine 128. The geographic engine 128 can be run and the coordinates can be retrieved from the database 314 for example. The PTT application 124 can generate an INVITE message that includes a field including the geographic coordinates and a flag that indicates that the message includes geographic coordinates.

Figure 8:
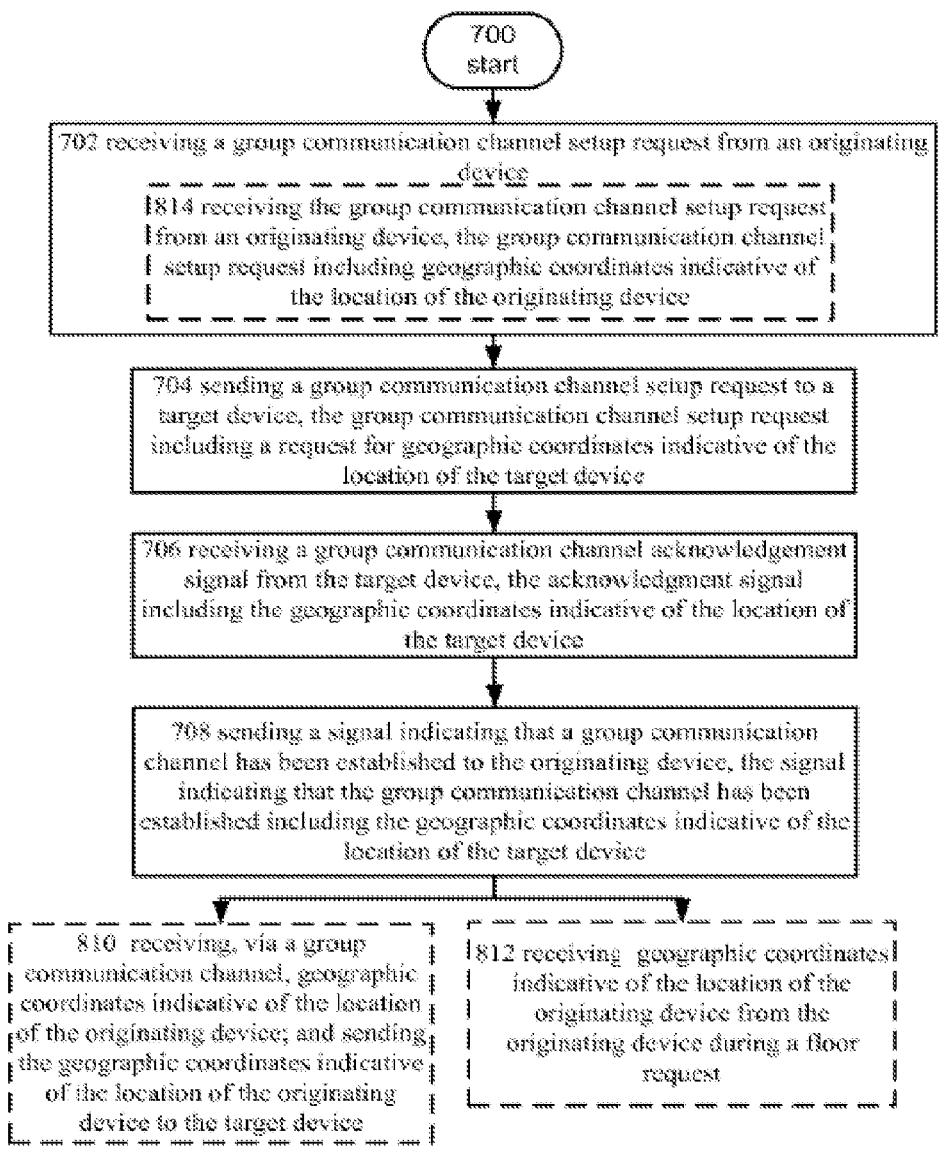
FIG. 8 illustrates an alternative embodiment of the operational procedure of FIG. 7.

Turning now to FIG. 8, it illustrates an alternative embodiment of the operational procedure of 700 including the additional operations 810-814. In an alternative embodiment of the operational procedure of FIG. 7, the operational procedure can include operation 810 which shows receiving, via a group communication channel, geographic coordinates indicative of the location of the originating device; and sending the geographic coordinates indicative of the location of the originating device to the target device. For example, in an example embodiment that includes operation 810 a group communication channel can be established between the originating and target devices. In this example embodiment the network adaptor 114 of the group communication server 310 can receive geographic coordinates for the originating device and send the geographic coordinates to the target via, for example, the established group communication channel, a different group communication channel, an email, a text message, etc. In a specific example, the network adaptor 114 can receive one or more packets of information from the originating device. The one or more packets can include the geographic coordinates. In this example the network adaptor 114 can store the coordinates in computer readable media 110 and send an interrupt to processor 102. The processor 102 can run the PTT application 124 and can obtain the geographic coordinates. The coordinates may be stored in database 114 and/or the coordinates can be placed in packets and sent to the target device.

In a specific embodiment the geographic coordinates can be sent while the originator device has the floor. For example, a user of the originator device can request the floor. A floor grant message can be received and the device 200 can receive a request via the PTT aware UI 224 indicating that GPS coordinates are to be shared during a subsequent talk burst. In another specific example the GPS coordinates can be sent using a different floor control mechanism than the one used for the PTT call. In this example the GPS coordinates are sent independently from the voice data over another PTT channel.

In yet another example the GPS coordinates can be received via the group communication channel, and sent to the target device in an email or text. For example, the target can be associated with an email account. The group communication server 310 can receive the GPS coordinates during a PTT spurt and the processor 102 can execute the PTT application 124 that can determine, for example, whether the target device can receive GPS coordinates via a PTT channel and/or whether a flag has been set indicating that the user of the device would want to receive GPS coordinates via a different mechanism. In this example, the PTT application 124 can be executed by the processor 102 and the processor 102 can determine an email address associated with the target. The processor 102 can then be configured to send the GPS coordinates to an email server. The email server can then send the GPS coordinates to the email address associated with the target. Similarly, instead of an email account, the PTT application can be executed by a processor 102 and a determination can be made that the target should be sent the GPS coordinates via text message. In this example the processor 102 can then be configured to send the GPS coordinates to a text message server which can send a text message to the target.

Continuing with the description of FIG. 8, operation 812 illustrates receiving geographic coordinates indicative of the location of the originating device from the originating device during a floor request. For example, a floor request message sent from the originating device can be received by a network adaptor 114. In this example the message can include the geographic coordinates indicative of the location of the originating device. In a specific example, the network adaptor 114 can receive one or more packets of information from the originating device that include a floor grant message having geographic coordinates. In this example the network adaptor 114 can store message in computer readable media 110 and send an interrupt to processor 102. The processor 102 can run the PTT application 124 and the PTT application 124 can parse the message to obtain the geographic coordinates. The PTT application 124 can then be run and the coordinates can be stored in the database 314. Once the server 310 receives the coordinates, they can be sent to the target device.

Continuing with the description of FIG. 8, operation 814 illustrates receiving the group communication channel setup request from an originating device, the group communication channel setup request including geographic coordinates indicative of the location of the originating device. For example, in an embodiment the group communication server 310 can receive a call setup request message that includes the originator's geographic coordinates. For example, the GPS subsystem 228 can obtain the GPS coordinates from a GPS chipset and make the coordinates available to a PTT aware UI 226. When the PTT button is pressed the processor 208 can be interrupted and directed to execute the PTT-client 226. The PTT-client 226 can obtain the coordinates and configure the processor 102 to generate a message addressed to the group communication server 310. The message can include XML for example that identifies the mobile device, e.g., telephone number, mobile subscriber identifier, username/password, for authorization purposes, the identity of the second wireless device, and GPS coordinates indicative of the location of the first wireless device.

Figure 9:
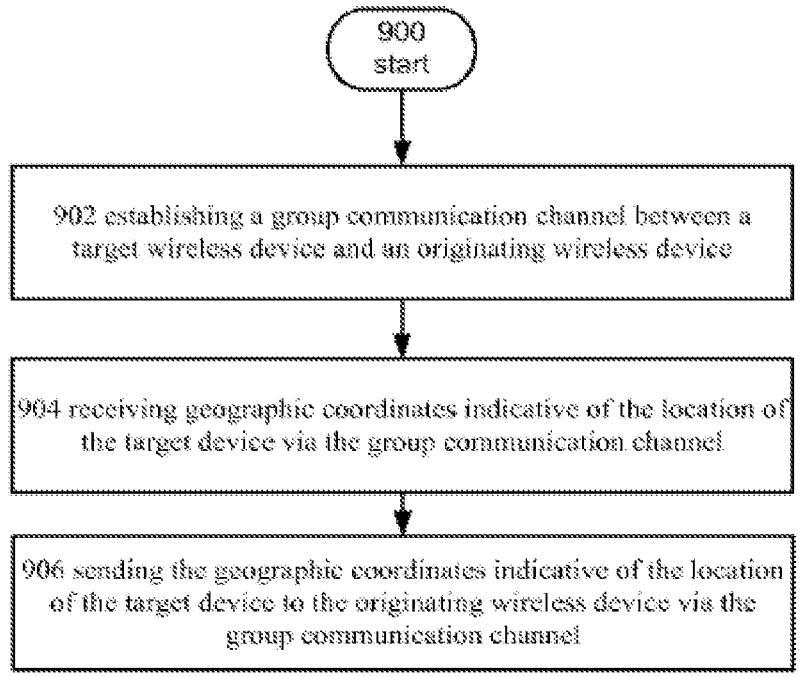
FIG. 9 illustrates an example operational procedure 900.

Turning now to FIG. 9, it illustrates an operational procedure for practicing aspects of the present disclosure including operations 900-906. Operation 900 begins the operational procedure and operation 902 shows establishing a group communication channel between a target wireless device and an originating wireless device. For example, in an embodiment a PTT communication channel can be established between the originating and target device. In this example embodiment the network adaptor 114 of the group communication server 310 can receive a request to setup a channel. A PTT application 124 can be executed by a processor 102 and the communications server 310 can perform PTT call setup functions, including locating the target, opening up IP channels between various IP endpoints in the network 308, applying call restrictions, selecting a vocoder, etc. Various messages can be sent back and forth between the devices and the group communication server 310 during the channel setup process.

Continuing with the description of FIG. 9, operation 904 shows receiving geographic coordinates indicative of the location of the target device via the group communication channel. For example, a group communication channel can be established between the originating and target device. In this example embodiment the network adaptor 114 of the group communication server 310 can receive geographic coordinates for the target device. In a specific example, the network adaptor 114 can receive one or more packets of information from the target device. The one or more packets can include the geographic coordinates. In this example the network adaptor 114 can store the coordinates in computer readable media 110 and send an interrupt to processor 102. The processor 102 can run the PTT application 124 and can obtain the geographic coordinates. The coordinates may be stored in database 114 and/or the coordinates can be placed in packets and send to the originator device.

In a specific embodiment the geographic coordinates can be sent while the target device has the floor. For example, a user of the target device can request the floor. A floor grant message can be received and the device can receive a request via the PTT aware UI 224 indicating that GPS coordinates are to be shared during a subsequent talk burst. In another specific example the GPS coordinates can be sent using a different floor control mechanism than the one used for the PTT call. In this example the GPS coordinates are sent independently from the voice data over another PTT channel.

Operation 906 shows sending the geographic coordinates indicative of the location of the target device to the originating wireless device via the group communication channel. Once the coordinates are received by the group communication server 310 they can be sent to the originating device via the group communication channel. The GPS coordinates can be processed and displayed by the originating device.

Figure 10:
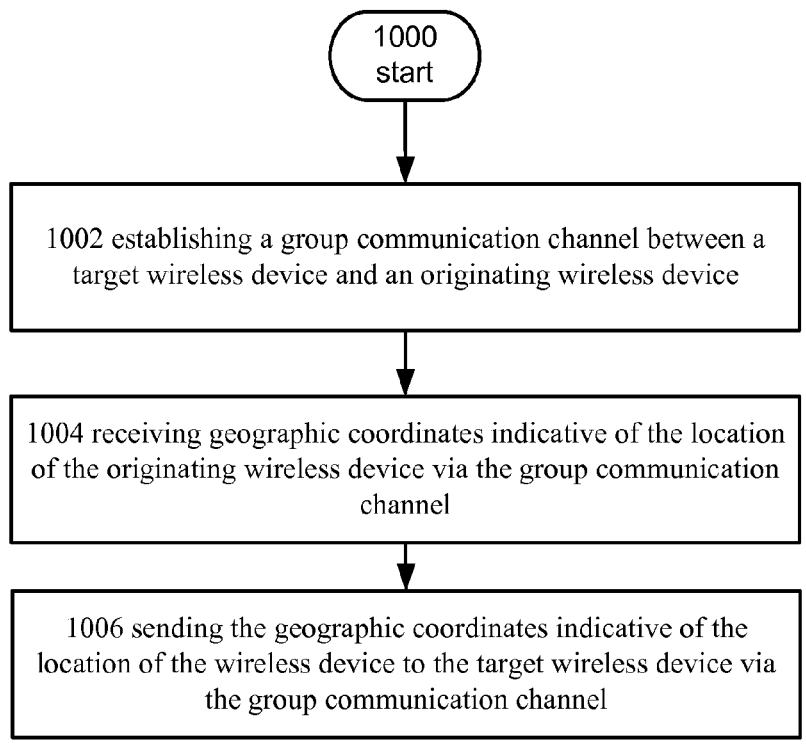
FIG. 10 illustrates an example operational procedure 1000.

Turning to FIG. 10, it illustrates an operational procedure for practicing aspects of the present disclosure including operations 1000-1006. Operation 1000 begins the procedure and operation 1002 shows establishing a group communication channel between a target wireless device and an originating wireless device. For example, a processor 102 of a group communication server 310 can execute instructions that configure it to establish a group communication channel between a target and originating device. A PTT application 124 can be executed by a processor 102 and the communications server 310 can perform PTT call setup functions, including locating the target, opening up IP channels between various IP endpoints in the network 308, applying call restrictions, selecting a vocoder, etc. Various messages can be sent back and forth between the devices and the group communication server 310 during the channel setup process.

Operation 1004 shows receiving geographic coordinates indicative of the location of the originating wireless device via the group communication channel. For example, a group communication channel can be established between the originating and target device. In this example embodiment the network adaptor 114 of the group communication server 310 can receive geographic coordinates for the originating device. In a specific example, the network adaptor 114 can receive one or more packets of information from the originating device. The one or more packets can include the geographic coordinates. In this example the network adaptor 114 can store the coordinates in computer readable media 110 and send an interrupt to processor 102. The processor 102 can run the PTT application 124 and can obtain the geographic coordinates. The coordinates may be stored in database 114 and/or the coordinates can be placed in packets and send to the originator device.

Operation 1006 shows sending the geographic coordinates indicative of the location of the wireless device to the target wireless device via the group communication channel. For example, once the coordinates are received by the group communication server 310 they can be sent to the target device via the group communication channel. Subsequently the GPS coordinates can be processed and displayed by the target device.

Figure 11:
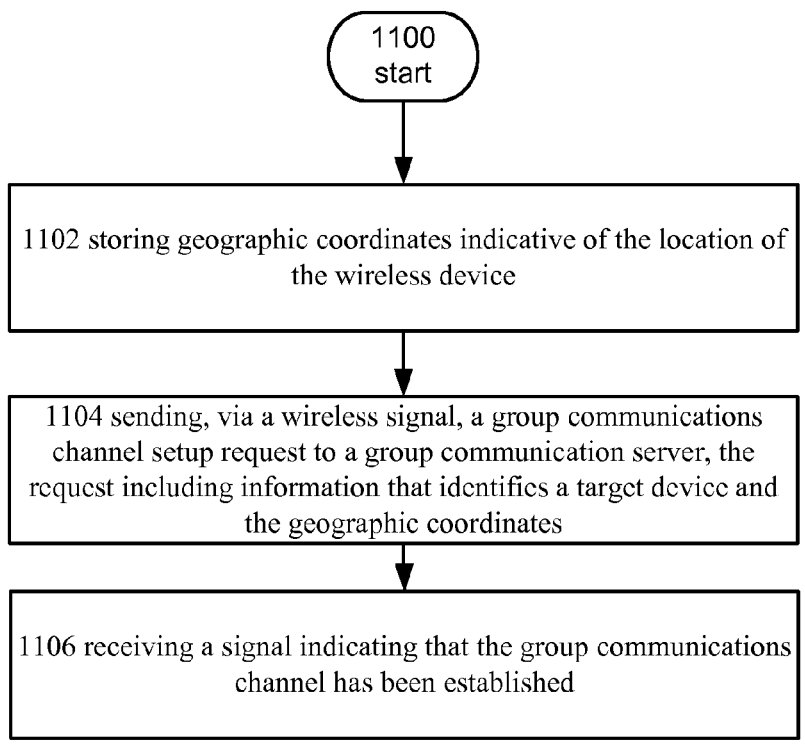
FIG. 11 illustrates an example operational procedure 1100.

Turning to FIG. 11, it illustrates an operational procedure for practicing aspects of the present disclosure including operations 1100-1106. Operation 1100 begins the operational procedure and operation 1102 shows storing geographic coordinates indicative of the location of the wireless device. For example, and turning to FIG. 2, memory 212, e.g., RAM or flash ROM, can store geographic coordinates indicative of the location of the wireless device 200. For example, the geographic coordinates can be GPS coordinates obtained by a chipset built into the device 200. A GPS subsystem 228 can process information generated by the chipset and store GPS coordinates in memory 212.

Continuing with the description of FIG. 11, operation 1104 shows sending, via a wireless signal, a group communications channel setup request to a group communication server, the request including information that identifies a target device and the geographic coordinates. For example, a transceiver of wireless device 200 can wirelessly send a request for a group communication channel to a base station controller 418 of FIG. 4. In this example, the request can identify a target and include the geographic coordinates. For example, a PTT-aware UI 224 can be executed by processor 208 and rendered on a screen 204. The device 200 can receive a request to enter into a PTT session via a touchpad and a target can be selected from a contact book, e.g., a program that uses a data structure stored in memory 212.

In the same, or another embodiment the device 200 can receive a request to send GPS coordinates in a setup request message. In this case, the PTT client 226 can receive information that identifies the target and receive the geographic coordinates from memory 212. The PTT client 226 can send information to the transceiver which will wirelessly transmit the information to the group communication server 310. In an embodiment the PTT client 226 can generate a call setup message addressed to the IP address of the group communication server 310. When the PTT button 202 is pressed the processor 208 can be interrupted and directed to execute the PTT-client 226. The PTT-client 226 can configure the processor 208 to generate a message addressed to the group communication server 310. The message can include XML for example that identifies the mobile device, e.g., telephone number, mobile subscriber identifier, username/password, for authorization purposes, information that identifies the second wireless device, and GPS coordinates.

Continuing with the description of FIG. 11, operation 1106 shows receiving a signal indicating that the group communications channel has been established. Continuing with the example, the PTT client 226 can receive a signal from the group communication server 310 which indicates that the group communication channel has been opened between the originating device and the target device. For example, the transceiver can receive an INVITE message indicating that the channel has been opened and information that identifies a floor control identifier. The processor 208 can be interrupted and execute the PTT client 226. The processor can then receive the signal and assign a new port for sending or receiving PTT call spurts.

Figure 12:
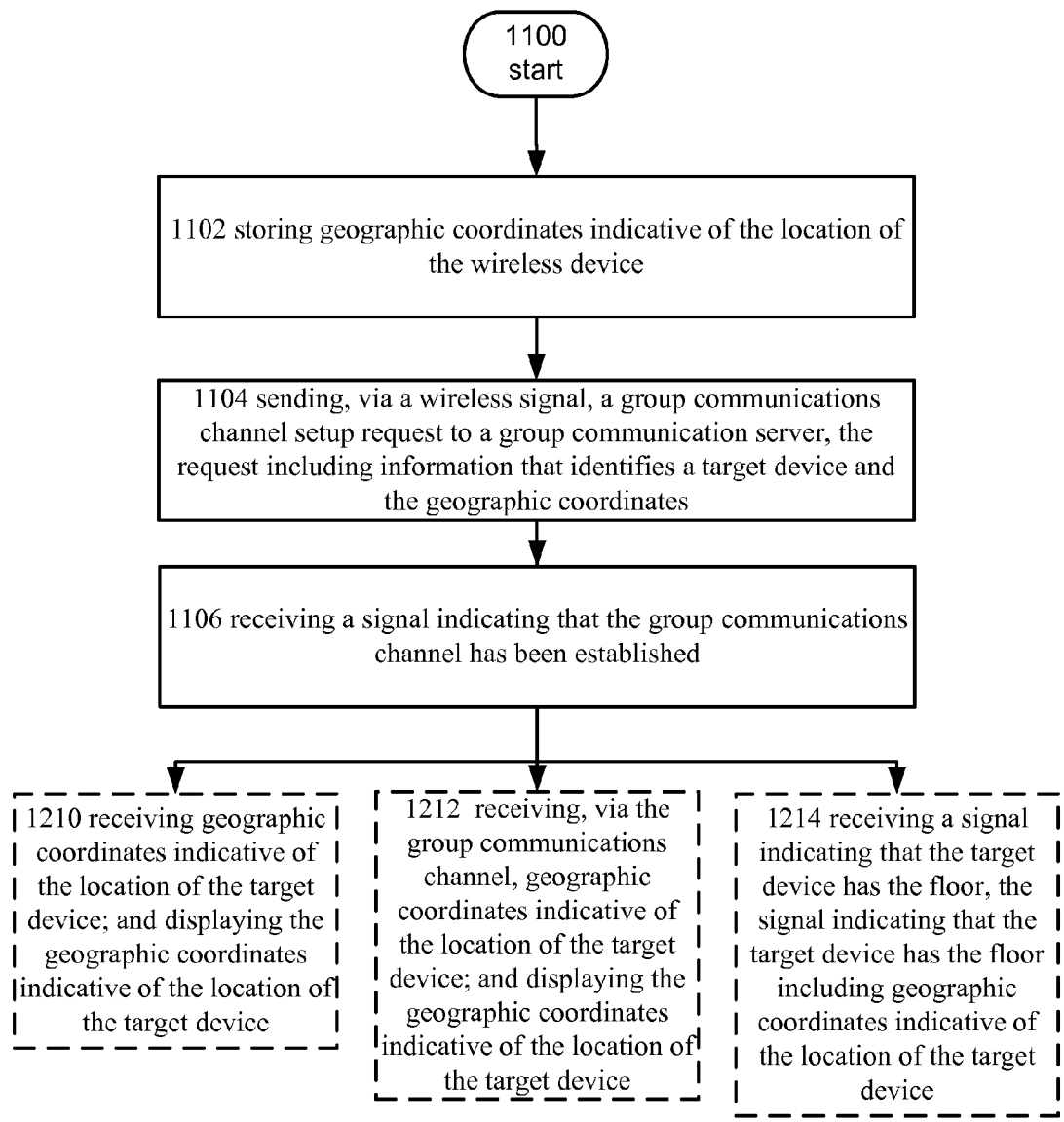
FIG. 12 illustrates an alternative embodiment of the operational procedure of FIG. 11.

Turning to FIG. 12, it illustrates an alternative embodiment of the operational procedure of FIG. 11 including operations 1210-1214. Operation 1210 shows receiving geographic coordinates indicative of the location of the target device; and displaying the geographic coordinates indicative of the location of the target device. For example, transceiver of device 200 can receive geographic coordinates that identify the location of the target and display 204 can display the coordinates. Various transmission mechanisms can be used to send the geographic coordinates to the device 200. For example, the GPS coordinates can be received via a control channel or a group communication channel. The coordinates can also be received via email or text. The device 200 can be configured to receive the coordinates and display the coordinates on the user interface. In this example the processor 208 can be interrupted with the geographic coordinate information is received and the PTT-aware UI 224 can be run. The processor 208 can render on a display 204 the location of each device that is in the PTT session with device 200. In the same or another embodiment a user interface notification can identify the target device that currently has the floor.

Continuing with the description of FIG. 12, it additionally includes operation 1212 which shows receiving, via the group communications channel, geographic coordinates indicative of the location of the target device; and displaying the geographic coordinates indicative of the location of the target device. For example, transceiver of device 200 can receive geographic coordinates that identify the location of the target and display 204 can display the coordinates. In this example the coordinates can be received over the group communication channel. For example, the target can obtain the floor and send geographic coordinates to the originator via the floor or independently from the voice floor over another PTT channel The device 200 can be configured to receive the coordinates and display the coordinates on display 204. In this example the processor 208 can be interrupted with the geographic coordinate information is received and the PTT-aware UI 224 can be run. The processor 208 can render on a display the location of each device that is in the PTT session with device 200. In the same or another embodiment a user interface notification can identify the target device that currently has the floor.

Continuing with the description of FIG. 12, operation 1214 shows receiving a signal indicating that the target device has the floor, the signal indicating that the target device has the floor including geographic coordinates indicative of the location of the target device. For example, the floor grant message can be received by the device 200 indicating that the target has the floor. In this example the GPS coordinates for the target device can be included in the message that identifies that the target has the floor. For example, when the target requested the floor the PTT application 124 of the group communication server 310 could have been executed to insure that only one device has the floor at any given time by implementing a floor control protocol. The PTT application 124 can grant the target the floor and send a message to the originator that indicates that the target obtained the floor. In this example embodiment the PTT application 124 can be run and receive information that GPS coordinates are to be shared during certain floor control messages. In this instance, when a floor grant message is sent to the originator it can include the GPS coordinate of the target device. The processor 102 of the server can run the PTT application 124 that can obtain location information from the location engine 128. The PTT application can then generate a floor grant message, e.g., a SIP message, that includes the GPS coordinates and send the message to the originator. The originator device can receive the message and the PTT-client 226 can be run. The message can be parsed and the coordinates can be obtained.

Figure 13:
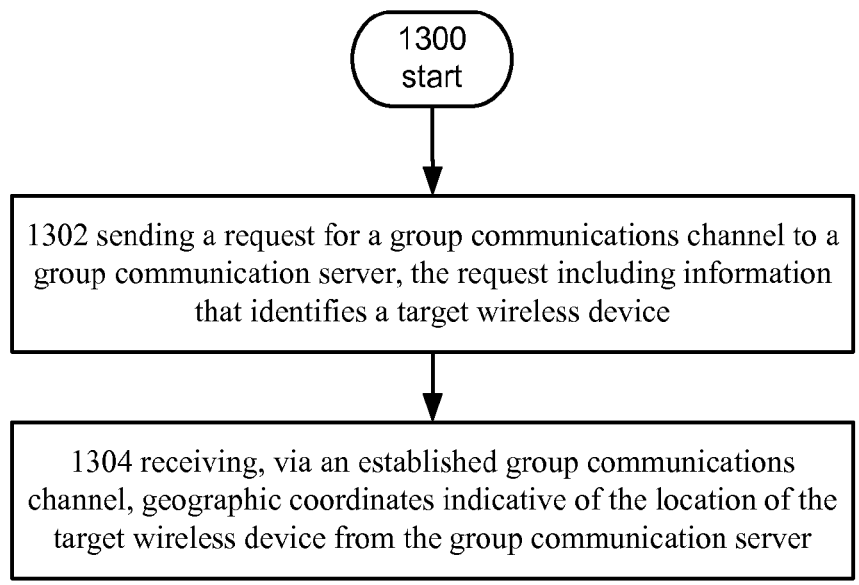
FIG. 13 illustrates an example operational procedure 1300.

FIG. 13 illustrates an operational procedure for practicing aspects of the present disclosure including operations 1300-1304. Operation 1300 begins the operational procedure, and operation 1302 illustrates sending a request for a group communications channel to a group communication server, the request including information that identifies a target wireless device. For example, a transceiver of wireless device 200 can wirelessly send a setup message for a group communication channel to a base station 420 of FIG. 4. In a specific embodiment the setup request message can be embedded in SIP message. The PTT-client 226 can have an IP address of the group communication server 310 stored in memory 212. When the PTT button is pressed the processor 208 can be interrupted and directed to execute the PTT-client 226. The PTT-client 226 can configure the processor 208 to generate a message addressed to the group communication server 310. The message can include XML for example that identifies the mobile device, e.g., telephone number, mobile subscriber identifier, username/password, for authorization purposes and information that identifies the second wireless device.

Continuing with the description of FIG. 13, it additionally shows operation 1304 which illustrates receiving, via an established group communications channel, geographic coordinates indicative of the location of the target wireless device from the group communication server. For example, a transceiver of the wireless device 200 can receive geographic coordinates for the target via the group communication channel. In this example the transceiver can store the coordinates in a buffer and interrupt a processor. The processor 208 can run the PTT client 226 and the client can receive the information from the buffer and store the coordinates in memory 212.

In a specific embodiment the geographic coordinates can be sent while the target device has the floor. For example, a user of the target device can request the floor. A floor grant message can be received and the device can receive a request via the PTT aware UI 224 indicating that GPS coordinates are to be shared during a subsequent talk burst. In another specific example the GPS coordinates can be sent using a different floor control mechanism than the one used for the PTT call. In this example the GPS coordinates are sent independently from the voice data over another PTT channel.

Figure 14:
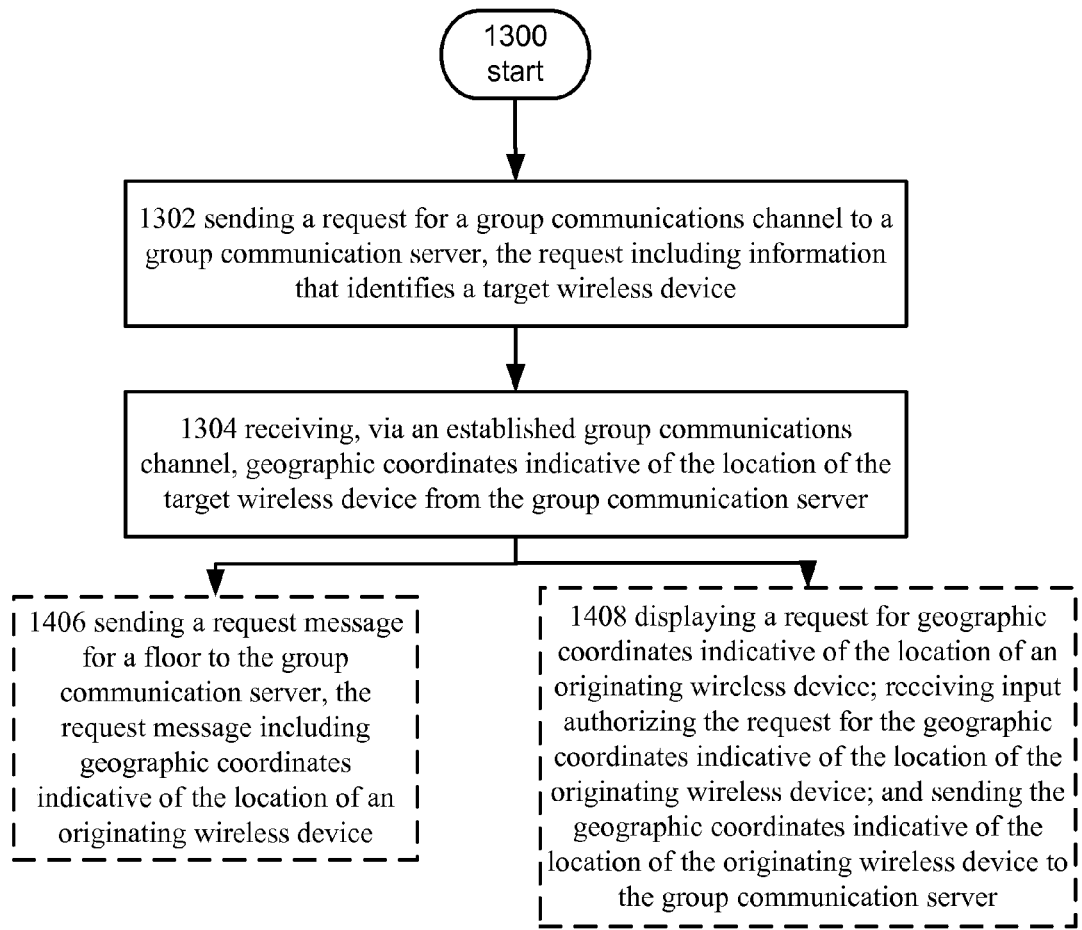
FIG. 14 illustrates an alternative embodiment of the operational procedure of FIG. 13.

Turning now to FIG. 14, it illustrates an alternative embodiment of the operational procedure of FIG. 13 including operations 1406 and 1408. As illustrated by the figure, operation 1406 shows sending a request message for a floor to the group communication server, the request message including geographic coordinates indicative of the location of an originating wireless device. For example, a transceiver of wireless device 200 can wirelessly send a request for a floor of the group communication channel to a base station 420 of FIG. 4. In this example, the request can include geographic coordinates of the sending device. For example, a PTT-aware UI 224 can be executed by processor 208 and rendered on a screen 204. In this example, the PTT aware UI 224 can receive a request to send PTT coordinates via the floor request message and the PTT client 226 can be configured to obtain GPS coordinates from GPS subsystem when the PTT button is pressed. When the PTT button 202 is pressed the GPS client 228 can be configured to notify the PTT client 226 that GPS coordinates have been added. The PTT client 226 can send a PTT floor request to the group communication server 310 that includes the floor identifier assigned to the channel.

Continuing with the description of the figure, operation 1408 shows displaying a request for geographic coordinates indicative of the location of an originating wireless device; receiving input authorizing the request for the geographic coordinates indicative of the location of the originating wireless device; and sending the geographic coordinates indicative of the location of the originating wireless device to the group communication server. For example, in an embodiment the device 200 can display a request for geographic coordinates. For example, PTT client 226 can receive a signal from the group communication server 310 which includes a request for GPS coordinates. The PTT client 226 can be executed by processor 208 and the request can be displayed on the user interface. The wireless device 200 can receive input via a touchpad or the like that indicates that the GPS coordinates can be shared. In this instance the GPS subsystem 228 can be executed and the current coordinates can be sent to the group communication server 310 via, for example, a group communication channel or other data channel.

Figure 15:
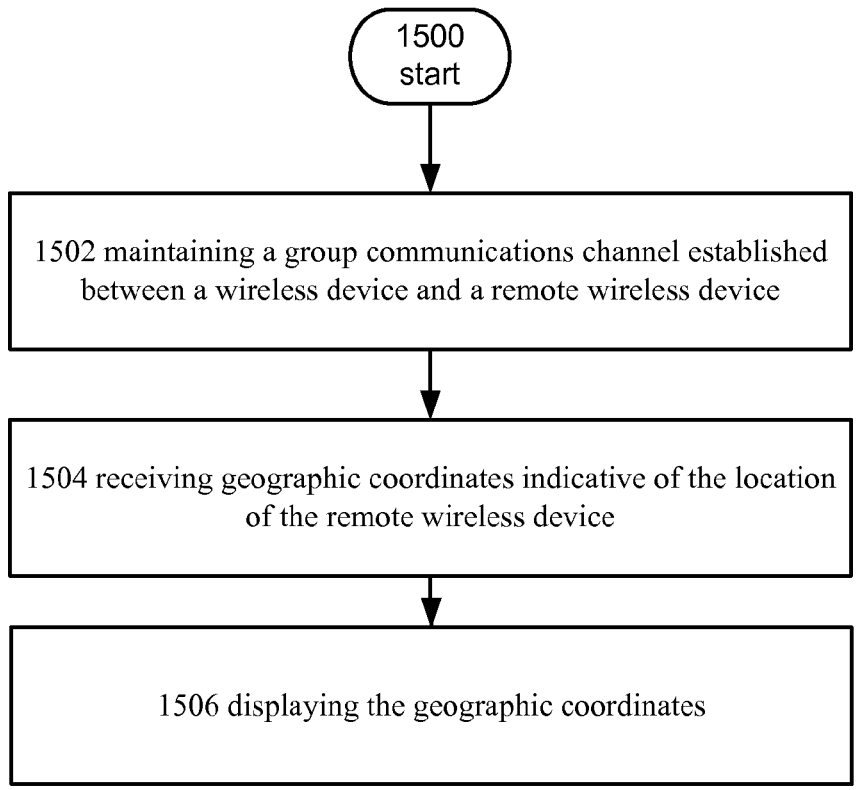
FIG. 15 illustrates an example operational procedure 1500.

Turning now to FIG. 15, it illustrates an operational procedure for practicing aspects of the present disclosure including operations 1500-1506. Operation 1500 begins the operational procedure and operation 1502 shows maintaining a group communications channel established between a wireless device and a remote wireless device. For example, in an embodiment a wireless device 200 can maintain a group communication channel that exists between the device and a remote wireless device. For example, in an embodiment a channel can be opened and assigned an IP port and information can be stored in memory 212. A PTT client 226 can be executed by a processor 208 and the processor 208 can listen for signals on the port. Session information, identifiers, and information that identifies another device in the session can be stored in a data structure in memory 212.

Continuing with the description of FIG. 15, operation 1504 shows receiving geographic coordinates indicative of the location of the remote wireless device. For example, the wireless device 200 can maintain a group communication channel and receive geographic coordinates for a remote wireless device. For example a transceiver of the wireless device 200 can receive GPS coordinates. The transceiver can store the GPS coordinates in a buffer and send an interrupt to the processor 208. The processor 208 can be configured to run interrupt handler code that direct it to run the PTT client 226. The PTT client 226 can receive the GPS coordinates from the buffer and store the coordinates in memory 212.

Continuing with the description of FIG. 15, operation 1506 shows displaying the geographic coordinates. For example, the device 200 can be configured to receive the coordinates and display the coordinates on the display 204. In a specific example the processor 208 can execute the PTT client 226 and can send the coordinates to the PTT UI 224. The PTT UI can be executed and the processor can display the coordinates on display 204. In this example the display 204 can display the location of each device that is in the PTT session with device 200. In the same or another embodiment the screen can also display each target and identify which one currently has the floor. In an example embodiment displaying the geographic coordinates can include displaying an icon at the location defined by the geographic coordinates. In this example the PTT UI 224 can render a map and overlay the icon on the geographic coordinates. The display may also be configured to place identification information on the map to show which device the icon is associated with.

Figure 16:
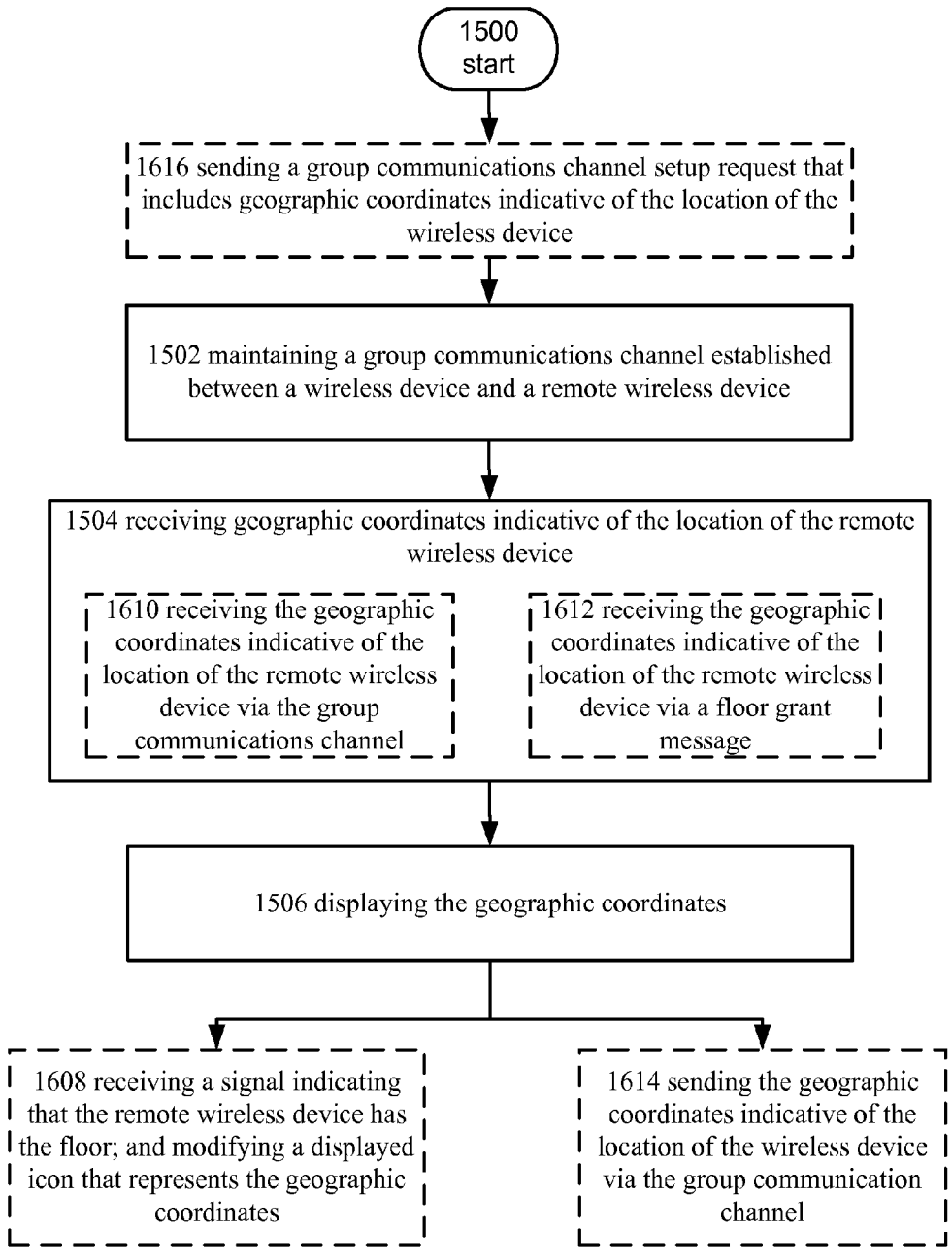
FIG. 16 illustrates an alternative embodiment of the operational procedure of FIG. 15.

Turning to FIG. 16, it shows an alternative embodiment of the operational procedure of FIG. 15 including operations 1608-1618. Operation 1608 shows receiving a signal indicating that the remote wireless device has the floor; and modifying a displayed icon that represents the geographic coordinates. For example the transceiver of wireless device 200 can receive a signal indicating that the remote wireless device has the floor. For example, in an embodiment the group communication server 310 can be configured to receive floor grant requests and grant them. In the instance that a floor grant request message is received from a device the group communication server 310 can in an embodiment grant the request and send signals to the other devices in the group that indicates that the floor is taken. In this case the PTT-aware UI 224 can receive information that the remote wireless device has the floor and the processor 208 can be configured to modify an icon that represents the position of the remote wireless device by, for example, changing the color of the icon, configuring the icon to flash, changing the size or shape of the icon, etc.

Continuing with the description of FIG. 16 operation 1610 shows receiving the geographic coordinates indicative of the location of the remote wireless device via the group communications channel. For example, a transceiver of the wireless device 200 can receive geographic coordinates for the remote wireless device via the group communication channel. In this example the transceiver can store the coordinates in a buffer and interrupt a processor. The processor can run the PTT client 226 and the client can receive the information from the buffer and store the coordinates in memory 212.

In a specific embodiment the geographic coordinates can be sent while the remote wireless device has the floor. For example, a user of the remote wireless device can request the floor. A floor grant message can be received and the device can receive a request via the PTT aware UI 224 indicating that GPS coordinates are to be shared during a subsequent talk burst. In another specific example the GPS coordinates can be sent using a different floor control mechanism than the one used for the PTT call. In this example the GPS coordinates are sent independently from the voice data over another PTT channel.

Continuing with the description of FIG. 16, operation 1612 shows receiving the geographic coordinates indicative of the location of the remote wireless device via a floor grant message. For example, the floor grant message can be received by the device 200 indicating that the target has the floor. In this example the GPS coordinates for the target device can be included in the message that identifies that the target has the floor. For example, when the target requested the floor the PTT application 124 of the group communication server 310 could have been executed to insure that only one device has the floor at any given time by implementing a floor control protocol. The PTT application 124 can grant the target the floor and send a message to the originator that indicates that the target obtained the floor. In this example embodiment the PTT application 124 can be run and receive information that GPS coordinates are to be shared during certain floor control messages. In this instance, when a floor grant message is sent to the originator it can include the GPS coordinate of the target device. The processor 102 of the server can run the PTT application 124 that can obtain location information from the location engine 128. The PTT application can then generate a floor grant message, e.g., a SIP message, that includes the GPS coordinates and send the message to the originator. The originator device can receive the message and the PTT-client 226 can be run. The message can be parsed and the coordinates can be obtained.

In another example, the wireless device can receive a message indicating that it has been granted the floor. In this embodiment the message indicating that the device has been granted the floor can include the geographic coordinates indicative of the location of the remote wireless device. For example, the group communication server 310 could have previously stored the geographic coordinates for the remote wireless device in computer readable storage media 110. In this example a processor 102 of the group communication server 310 could execute PTT client 124 in response to receiving the floor grant request from wireless device. The PTT application can then generate a floor grant message, e.g., a SIP message, that includes the GPS coordinates and send the message to the originator. The originator device can receive the message and the PTT-client 226 can be run. The message can be parsed and the coordinates can be obtained.

Continuing with the description of FIG. 16 operation 1614 shows sending the geographic coordinates indicative of the location of the wireless device via the group communication channel. For example, a transceiver of a wireless device 200 can send GPS coordinates via an established group communication channel to, for example, the group communication server 310. In a specific example the group communication channel can include a push to talk channel. In this scenario the user can be participating in a PTT call and the device 200 can receive a request via the PTT aware UI 224 indicating that GPS coordinates are to be shared during a subsequent talk burst from the device 200. The GPS subsystem 228 can send, or make available, e.g., by placing information in a shared memory, GPS coordinates so that the PTT client 226 can send them during the existing PTT call. The add-GPS request can contain an indication that the data is to be shared using the same floor control mechanism as the PTT Client 226 or in another specific example the GPS coordinates can be sent by using a different floor control mechanism than the PTT call. In either case, the PTT client 226 can be executed by the processor 208 and the processor 208 can send the GPS coordinates during a PTT talk spurt.

Continuing with the description of FIG. 16, operation 1616 depicts sending a group communications channel setup request that includes geographic coordinates indicative of the location of the wireless device. For example, a transceiver of a wireless device 200 can send GPS coordinates via an established group communication channel to, for example, the group communication server 310. In a specific example the group communication channel can include a push to talk channel In this scenario the user can be participating in a PTT call and the device 200 can receive a request via the PTT aware UI 224 indicating that GPS coordinates are to be shared during a subsequent talk burst from the device 200. The GPS subsystem 228 can send, or make available, e.g., by placing information in a shared memory, GPS coordinates so that the PTT client 226 can send them during the existing PTT call. The add-GPS request can contain an indication that the data is to be shared using the same floor control mechanism as the PTT Client 226 or in another specific example the GPS coordinates can be sent by using a different floor control mechanism than the PTT call. In either case, the PTT client 226 can be executed by the processor 208 and the processor 208 can send the GPS coordinates during a PTT talk spurt.

Figure 17:
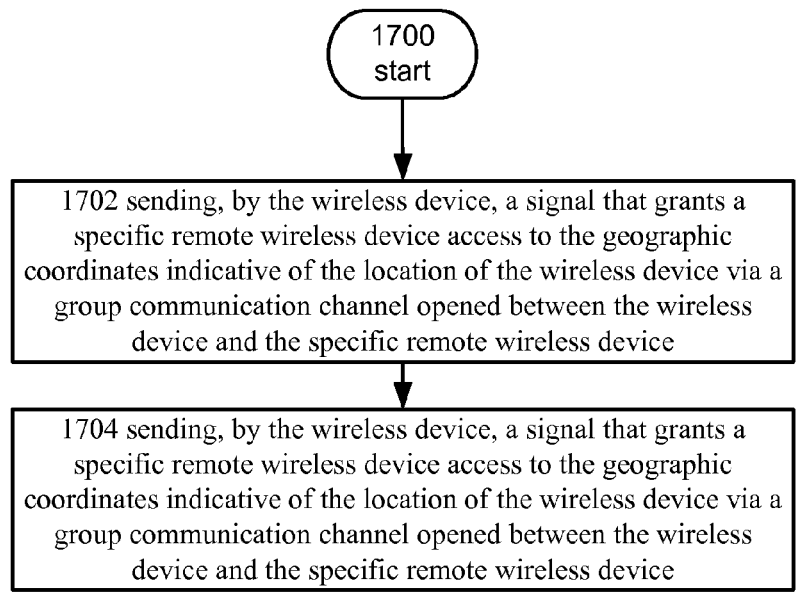
FIG. 17 illustrates an example operational procedure 1700.

Turning to FIG. 17, it illustrates an operational procedure for practicing aspects of the present disclosure including operations 1700-1704. Operation 1700 begins the operational procedure and operation 1702 illustrates sending, by the wireless device, a signal that grants a specific remote wireless device access to the geographic coordinates indicative of the location of the wireless device via a group communication channel opened between the wireless device and the specific remote wireless device. For example, a wireless device 200 can execute instructions that configure a transceiver to send a signal to a group communication server 310. The signal in this example can include the geographic coordinates indicative of the location of the wireless device. For example, the GPS subsystem 228 can be configured to execute in a predetermined manner and obtain the wireless device's location, e.g., it can run when the processor 208 is interrupted, when a call is received, when user input is received, at a predetermined time interval, when a signal from a base station is received, etc. When the GPS subsystem 228 executes it can obtain GPS coordinates from a GPS chipset of the wireless device 200 and send the coordinates to the group communication server via a transceiver.

In this example the group communication server 310 can be configured to store the GPS coordinates of at least the wireless device 200 in a database 314. The group communication server 310 can execute the PTT-GPS application 128 and the processor 102 can update the location of the wireless device 200. In this example the PTT-GPS application 128 can be configured to selectively grant access to the GPS coordinates during group communication sessions. That is, when a PTT channel is opened between the wireless device 200 and another wireless device, e.g., device 304, the group communication server 310 can be configured to selectively send the GPS coordinates indicative of the location of the wireless device 200 to the other device 304 based on whether or not access to the coordinates has been granted to the other wireless device 304.

Continuing with the description of FIG. 17, operation 1704 shows sending, by the wireless device, a signal that grants a specific remote wireless device access to the geographic coordinates indicative of the location of the wireless device via a group communication channel opened between the wireless device and the specific remote wireless device. For example, in an embodiment the wireless device 200 can send a signal to the group communication server 310 that authorizes the server to send geographic coordinates to a specific wireless device that is currently in a group communication session with the wireless device. For example, a group communication session can be opened between the wireless device and a specific remote wireless device. If the wireless device was the originating device, a PTT-aware UI 224 could have been executed by processor 208 and rendered on a screen 204. The device 200 could have received a request to enter into a PTT session via a touchpad and the specific remote wireless device could have been selected from a contact book, e.g., a program that uses a data structure stored in memory 212. In addition the device 200 can receive a request to send GPS coordinates in the setup request message. If the wireless device was the target, it could have received a call setup request message and the PTT-aware UI 224 could have been executed and a request could be displayed on display 204. The user interface, e.g., touchpad, could have received a request to enter into the session and a transceiver could have sent a signal indicating a desire to enter into a group communication session 310.

Regardless as to who was the originator or the target, an operator of the wireless device 200 can select an option displayed by display 204 that sends a signal to the group communication server 310 indicating that GPS coordinates can be released to the remote wireless device. For example, during the conversation the remote wireless device 200 could send a request for the coordinates that is subsequently displayed by display 204. In a specific example the request may say something such as "Would you like to send GPS coordinates to remote wireless device?" The user of device 200 can select "Yes" or "No" and the server 310 can act accordingly. In another example the operator of mobile device 200 may on his or her own decide to release GPS coordinates to the remote wireless device. In this example the PTT-aware UI 224 can render a screen that allows the user, via a user interface, to select an option to send coordinates. A signal can be sent to the group communication server 310 and the server can send the coordinates to the remote wireless device.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A system for communicating geographical location data to one or more wireless devices that are members of a communication group of a plurality of wireless devices on a wireless network, comprising:

at least one requesting wireless device that is a member of the communication group, the at least one requesting wireless device selectively in communication with the wireless network and configured to request geographical location data of at least one other member of the communication group via a preferred mechanism for receiving geographical location data; and a group communication server that supports group communications over a half-duplex communication channel between wireless devices that are members of the communication group, the group communication server configured to selectively receive at least a request for the geographical location data of the at least one other member of the communication group from the at least one requesting wireless device, obtain the geographical location data of the at least one other member of the communication group, and transmit the geographical location data of the at least one other member of the communication group to the at least one requesting wireless device via the preferred mechanism of the requesting wireless device for receiving geographical location data.

2. A group communication server method, comprising:

storing, in memory, first geographical location data for a first wireless device;

receiving a flag from the first wireless device indicating a preferred mechanism for receiving geographical location data;

receiving, from a second wireless device, a group communication channel setup request over a half-duplex communication channel, the request including information that identifies the second wireless device; and sending second geographical location data for the second wireless device to the first wireless device via the preferred mechanism.

3. The method of claim 2, wherein sending second geographical location data for the second wireless device to the first wireless device via the preferred mechanism comprises:

sending the second geographical location data for the second wireless device to the first wireless device by embedding the second geographical location data within a floor grant message.

4. The method of claim 2, wherein receiving a group communication channel setup request comprises:

receiving a group communication channel setup request that includes a request for the second geographical location data of the second wireless device.

5. The method of claim 2, wherein receiving a group communication channel setup request comprises:

receiving a group communication channel setup request that includes the first geographical location data for the first wireless device.

6. The method of claim 2, further comprising:

receiving the first geographical location data for the first wireless device via an established group communication channel; and sending the first geographical location data for the first wireless device to the second wireless device via the established group communication channel.

7. The method of claim 6, wherein receiving the first geographical location data for the first wireless device comprises:

receiving a floor request from the first wireless device;

sending a floor grant message to the first wireless device; and receiving the first geographical location data for the first wireless device after sending the floor grant message.

8. The method of claim 7, wherein the first geographical location data is received through a floor control mechanism used for sharing both the first geographical location data and voice data.

9. The method of claim 7, wherein the first geographical location data is received through a floor control mechanism used solely for sharing the first geographical location data.

10. The method of claim 2, further comprising:
sending the group communication channel setup request to the second wireless device, the group communication channel setup request including the first geographical location data for the first wireless device.

11. The method of claim 2, wherein sending second geographical location data for the second wireless device to the first wireless device via the preferred mechanism comprises sending an INVITE message to the first wireless device indicating that a group communication channel has been opened.

12. A group communication server, comprising:
a processor coupled to a transceiver and configured with software instructions to perform operations comprising:
receiving a flag from an originating device indicating a preferred mechanism for receiving geographical location data;
receiving a group communication channel setup request from the originating device over a half-duplex communication channel;
sending the group communication channel setup request to a target device with a request for target geographical location data for the target device embedded within the group communication channel setup request;
receiving a group communication channel acknowledgement signal from the target device, with the target geographical location data for the target device embedded within the group communication channel acknowledgement signal;
sending a signal indicating that a group communication channel has been established to the originating device; and
sending the target geographical location data for the target device to the originating device via the preferred mechanism.

13. The group communication server of claim 12, wherein the processor is configured with software instructions to perform operations further comprising:
receiving, via the group communication channel, originating geographical location data for the originating device; and
sending the originating geographical location data for the originating device to the target device.

14. The group communication server of claim 13, wherein the processor is configured with software instructions to perform operations such that receiving, via the group communication channel, originating geographical location data for the originating device comprises:
receiving a floor request from the originating device;
sending a floor grant message to the originating device; and
receiving the originating geographical location data for the originating device after sending the floor grant message.

15. The group communication server of claim 14, wherein the processor is configured with software instructions to perform operations such that the originating geographical location data is received through a floor control mechanism used for sharing both the originating geographical location data and voice data.

16. The group communication server of claim 14, wherein the processor is configured with software instructions to perform operations such that the originating geographical location data is received through a floor control mechanism used solely for sharing the originating geographical location data.

17. The group communication server of claim 13, wherein the processor is configured with software instructions to perform operations such that sending the originating geographical location data for the originating device to the target device comprises sending the originating geographical location data for the originating device to the target device based on a flag of the target device indicating a preferred mechanism for receiving the originating geographical location data.

18. The group communication server of claim 12, wherein the processor is configured with software instructions to perform operations further comprising:
receiving originating geographical location data for the originating device from the originating device embedded within a floor request message.

19. The group communication server of claim 12, wherein the processor is configured with software instructions to perform operations such that receiving a group communication channel setup request from an originating device over a half-duplex communication channel comprises:
receiving the group communication channel setup request from the originating device over the half-duplex communication channel, with originating geographical location data for the originating device embedded within the group communication channel setup request.

20. A non-transitory computer readable storage medium having stored thereon processor executable instructions configured to cause a processor to perform operations, comprising:
receiving a flag from an originating wireless device indicating a preferred mechanism for receiving geographical location data;
establishing a half-duplex group communication channel between a target wireless device and the originating wireless device;
receiving target geographical location data for the target wireless device via the half-duplex group communication channel; and
sending the target geographical location data for the target wireless device to the originating wireless device via the preferred mechanism.

21. The non-transitory computer readable storage medium of claim 20, wherein the stored processor executable instructions are configured to cause the processor to perform operations such that receiving target geographical location data for the target wireless device via the half-duplex group communication channel comprises:
receiving a floor request from the target wireless device;
sending a floor grant message to the target wireless device; and
receiving the target geographical location data for the target wireless device after sending the floor grant message.

22. The non-transitory computer readable storage medium of claim 21, wherein the stored processor executable instructions are configured to cause the processor to perform operations such that the target geographical location data is received through a floor control mechanism used for sharing both the target geographical location data and voice data.

23. The non-transitory computer readable storage medium of claim 21, wherein the stored processor executable instructions are configured to cause the processor to perform operations such that the target geographical location data is received through a floor control mechanism used solely for sharing the target geographical location data.

24. A group communication server, comprising:
  means for receiving a flag from a target wireless device indicating a preferred mechanism for receiving geographical location data;
  means for establishing a half-duplex group communication channel between the target wireless device and an originating wireless device;
  means for receiving originating geographical location data for the originating wireless device via the half-duplex group communication channel; and
  means for sending the originating geographical location data for the originating wireless device to the target wireless device via the preferred mechanism.

25. A wireless device, comprising:
  a transceiver;
  a memory; and
  a processor coupled to the transceiver and the memory and configured with software instructions to perform operations comprising:
    storing originating geographical location data for the wireless device in the memory;
    sending a flag to a group communication server indicating a preferred mechanism for receiving geographical location data;
    sending, via a wireless signal, a group communication channel setup request to the group communication server, with information that identifies a target device and the originating geographical location data for the wireless device embedded within the group communication channel setup request;
    receiving a signal over a half-duplex group communication channel indicating that a group communication channel has been established; and
    receiving target geographical location data for the target device via the preferred mechanism.

26. The wireless device of claim 25, wherein the processor is configured with software instructions to perform operations further comprising:
  displaying the target geographical location data for the target device.

27. The wireless device of claim 25, wherein the processor is configured with software instructions to perform operations such that receiving target geographical location data for the target device via the preferred mechanism comprises:
  receiving, via the group communication channel, the target geographical location data for the target device; and
  displaying the target geographical location data for the target device.

28. The wireless device of claim 25, wherein the processor is configured with software instructions to perform operations such that receiving target geographical location data for the target device via the preferred mechanism comprises:
  receiving a signal indicating that the target device has a floor, with the target geographical location data for the target device embedded within the signal indicating that the target device has the floor.

29. The wireless device of claim 25, wherein the processor is configured with software instructions to perform operations such that receiving a signal over a half-duplex group communication channel indicating that a group communication channel has been established comprises receiving an INVITE message indicating that the group communication channel has been opened.

30. A non-transitory computer readable storage medium having stored thereon processor executable instructions configured to cause a processor to perform operations comprising:
  sending a flag to a group communication server indicating a preferred mechanism for receiving geographical location data;
  sending a group communication channel setup request to the group communication server over a half-duplex communication channel, with information that identifies a target wireless device embedded within the group communication channel setup request; and
  receiving target geographical location data for the target wireless device from the group communication server via the preferred mechanism.

31. The non-transitory computer readable storage medium of claim 30, wherein the stored processor executable instructions are configured to cause the processor to perform operations further comprising:
  sending a floor request message to the group communication server, with geographic coordinates indicative of a location of an originating wireless device embedded within the floor request message.

32. The non-transitory computer readable storage medium of claim 30, wherein the stored processor executable instructions are configured to cause the processor to perform operations further comprising:
  displaying a request for originating geographical location data of an originating wireless device;
  receiving input authorizing the request for the originating geographical location data of the originating wireless device; and
  sending the originating geographical location data of the originating wireless device to the group communication server.

33. The non-transitory computer readable storage medium of claim 30, wherein the stored processor executable instructions are configured to cause the processor to perform operations further comprising displaying when the target wireless device currently has a floor.

34. The non-transitory computer readable storage medium of claim 30, wherein the stored processor executable instructions are configured to cause the processor to perform operations such that receiving target geographical location data for the target wireless device from the group communication server via the preferred mechanism comprises receiving the target geographical location data for the target wireless device when the target wireless device has a floor.

35. A wireless device, comprising:
  means for sending a flag to a group communication server indicating a preferred mechanism for receiving geographical location data;
  means for maintaining a group communication channel over a half-duplex communication channel established between the wireless device and a remote wireless device;
  means for receiving geographical location data for the remote wireless device from the group communication server via the preferred mechanism; and
  means for displaying the geographical location data.

36. The wireless device of claim 35, further comprising:
  means for receiving a signal indicating that the remote wireless device has a floor; and
  means for modifying a displayed icon that represents the geographical location data.

37. The wireless device of claim 35, wherein means for receiving geographical location data for the remote wireless device from the group communication server via the preferred mechanism comprises:

means for receiving the geographical location data for the remote wireless device via the group communication channel.

38. The wireless device of claim 37, wherein means for receiving the geographical location data for the remote wireless device via the group communication channel comprises means for receiving the geographical location data for the remote wireless device when the remote wireless device has a floor.

39. The wireless device of claim 35, wherein means for receiving geographical location data for the remote wireless device from the group communication server via the preferred mechanism comprises:
means for receiving the geographical location data for the remote wireless device embedded within a floor grant message.

40. The wireless device of claim 35, further comprising:
means for sending the geographical location data for the wireless device via the group communication channel.

41. The wireless device of claim 35, further comprising:
means for sending a group communication channel setup request with geographical location data for the wireless device embedded within the group communication channel setup request.

42. A non-transitory computer readable storage medium having stored thereon processor executable instructions configured to cause a processor to perform operations comprising:
sending a flag to a group communication server indicating a preferred mechanism for receiving geographical location data;
sending geographical location data from a wireless device over a half-duplex communication channel to the group communication server that is configured to selectively grant access to the geographical location data from the wireless device during a group communication session by embedding the geographical location data from the wireless device within a floor control message;
sending a signal from the wireless device granting access to a specific remote wireless device to the geographical location data from the wireless device via a group communication channel opened between the wireless device and the specific remote wireless device; and
receiving geographical location data for the specific remote wireless device from the group communication server via the preferred mechanism.

43. A group communication server, comprising:
means for storing, in memory, first geographical location data for a first wireless device;
means for receiving a flag from the first wireless device indicating a preferred mechanism for receiving geographical location data;
means for receiving, from a second wireless device, a group communication channel setup request over a half-duplex communication channel, the request including information that identifies the second wireless device; and
means for sending second geographical location data for the second wireless device to the first wireless device via the preferred mechanism.

44. The group communication server of claim 43, wherein means for sending second geographical location data for the second wireless device to the first wireless device via the preferred mechanism comprises:
means for sending the second geographical location data for the second wireless device to the first wireless device by embedding the second geographical location data within a floor grant message.

45. The group communication server of claim 43, wherein means for receiving a group communication channel setup request comprises:
means for receiving a group communication channel setup request that includes a request for the second geographical location data of the second wireless device.

46. The group communication server of claim 43, wherein means for receiving a group communication channel setup request comprises:
means for receiving a group communication channel setup request that includes the first geographical location data for the first wireless device.

47. The group communication server of claim 43, further comprising:
means for receiving the first geographical location data for the first wireless device via an established group communication channel; and
means for sending the first geographical location data for the first wireless device to the second wireless device via the established group communication channel.

48. The group communication server of claim 47, wherein means for receiving the first geographical location data for the first wireless device comprises:
means for receiving a floor request from the first wireless device;
means for sending a floor grant message to the first wireless device; and
means for receiving the first geographical location data for the first wireless device after sending the floor grant message.

49. The group communication server of claim 48, wherein the first geographical location data is received through a floor control mechanism used for sharing both the first geographical location data and voice data.

50. The group communication server of claim 48, wherein the first geographical location data is received through a floor control mechanism used solely for sharing the first geographical location data.

51. The group communication server of claim 43, further comprising:
means for sending the group communication channel setup request to the second wireless device, the group communication channel setup request including the first geographical location data for the first wireless device.

52. The group communication server of claim 43, wherein means for sending second geographical location data for the second wireless device to the first wireless device via the preferred mechanism comprises means for sending an INVITE message to the first wireless device indicating that a group communication channel has been opened.

53. A group communication server, comprising:
a memory; and
a processor coupled to the memory, wherein the processor is configured with processor-executable instructions to perform operations comprising:
storing, in the memory, first geographical location data for a first wireless device;
receiving a flag from the first wireless device indicating a preferred mechanism for receiving geographical location data;
receiving, from a second wireless device, a group communication channel setup request over a half-duplex communication channel, the request including information that identifies the second wireless device; and sending second geographical location data for the second wireless device to the first wireless device via the preferred mechanism.

54. The group communication server of claim 53, wherein the processor is configured with processor-executable instructions to perform operations such that sending second geographical location data for the second wireless device to the first wireless device via the preferred mechanism comprises:
  sending the second geographical location data for the second wireless device to the first wireless device by embedding the second geographical location data within a floor grant message.

55. The group communication server of claim 53, wherein the processor is configured with processor-executable instructions to perform operations such that receiving a group communication channel setup request comprises:
  receiving a group communication channel setup request that includes a request for the second geographical location data of the second wireless device.

56. The group communication server of claim 53, wherein the processor is configured with processor-executable instructions to perform operations such that receiving a group communication channel setup request comprises:
  receiving a group communication channel setup request that includes the first geographical location data for the first wireless device.

57. The group communication server of claim 53, wherein the processor is configured with processor-executable instructions to perform operations further comprising:
  receiving the first geographical location data for the first wireless device via an established group communication channel; and
  sending the first geographical location data for the first wireless device to the second wireless device via the established group communication channel.

58. The group communication server of claim 57, wherein the processor is configured with processor-executable instructions to perform operations such that receiving the first geographical location data for the first wireless device comprises:
  receiving a floor request from the first wireless device;
  sending a floor grant message to the first wireless device; and
  receiving the first geographical location data for the first wireless device after sending the floor grant message.

59. The group communication server of claim 58, wherein the processor is configured with processor-executable instructions to perform operations such that the first geographical location data is received through a floor control mechanism used for sharing both the first geographical location data and voice data.

60. The group communication server of claim 58, wherein the processor is configured with processor-executable instructions to perform operations such that the first geographical location data is received through a floor control mechanism used solely for sharing the first geographical location data.

61. The group communication server of claim 53, wherein the processor is configured with processor-executable instructions to perform operations further comprising:
  sending the group communication channel setup request to the second wireless device, the group communication channel setup request including the first geographical location data for the first wireless device.

62. The group communication server of claim 53, wherein the processor is configured with processor-executable instructions to perform operations such that sending second geographical location data for the second wireless device to the first wireless device via the preferred mechanism comprises sending an INVITE message to the first wireless device indicating that a group communication channel has been opened.

63. A non-transitory processor-readable storage medium having stored thereon processor-executable software instructions configured to cause a processor to perform operations for communicating geographical location data, the operations comprising:
  storing, in memory, first geographical location data for a first wireless device;
  receiving a flag from the first wireless device indicating a preferred mechanism for receiving geographical location data;
  receiving, from a second wireless device, a group communication channel setup request over a half-duplex communication channel, the request including information that identifies the second wireless device; and
  sending second geographical location data for the second wireless device to the first wireless device via the preferred mechanism.

64. The non-transitory processor-readable storage medium of claim 63, wherein the stored processor-executable software instructions are configured to cause a processor to perform operations such that sending second geographical location data for the second wireless device to the first wireless device via the preferred mechanism comprises:
  sending the second geographical location data for the second wireless device to the first wireless device by embedding the second geographical location data within a floor grant message.

65. The non-transitory processor-readable storage medium of claim 63, wherein the stored processor-executable software instructions are configured to cause a processor to perform operations such that receiving a group communication channel setup request comprises:
  receiving a group communication channel setup request that includes a request for the second geographical location data of the second wireless device.

66. The non-transitory processor-readable storage medium of claim 63, wherein the stored processor-executable software instructions are configured to cause a processor to perform operations such that receiving a group communication channel setup request comprises:
  receiving a group communication channel setup request that includes the first geographical location data for the first wireless device.

67. The non-transitory processor-readable storage medium of claim 63, wherein the stored processor-executable software instructions are configured to cause a processor to perform operations further comprising:
  receiving the first geographical location data for the first wireless device via an established group communication channel; and
  sending the first geographical location data for the first wireless device to the second wireless device via the established group communication channel.

68. The non-transitory processor-readable storage medium of claim 67, wherein the stored processor-executable software instructions are configured to cause a processor to perform operations such that receiving the first geographical location data for the first wireless device comprises:
  receiving a floor request from the first wireless device;
  sending a floor grant message to the first wireless device; and receiving the first geographical location data for the first wireless device after sending the floor grant message.

69. The non-transitory processor-readable storage medium of claim 68, wherein the stored processor-executable software instructions are configured to cause a processor to perform operations such that the first geographical location data is received through a floor control mechanism used for sharing both the first geographical location data and voice data.

70. The non-transitory processor-readable storage medium of claim 68, wherein the stored processor-executable software instructions are configured to cause a processor to perform operations such that the first geographical location data is received through a floor control mechanism used solely for sharing the first geographical location data.

71. The non-transitory processor-readable storage medium of claim 63, wherein the stored processor-executable software instructions are configured to cause a processor to perform operations further comprising:
sending the group communication channel setup request to the second wireless device, the group communication channel setup request including the first geographical location data for the first wireless device.

72. The non-transitory processor-readable storage medium of claim 63, wherein the stored processor-executable software instructions are configured to cause a processor to perform operations such that sending second geographical location data for the second wireless device to the first wireless device via the preferred mechanism comprises sending an INVITE message to the first wireless device indicating that a group communication channel has been opened.

73. A method for communicating geographical location data with a group communication server, comprising:
receiving a flag from an originating device indicating a preferred mechanism for receiving geographical location data;
receiving a group communication channel setup request from the originating device over a half-duplex communication channel;
sending the group communication channel setup request to a target device with a request for target geographical location data for the target device embedded within the group communication channel setup request;
receiving a group communication channel acknowledgement signal from the target device, with the target geographical location data for the target device embedded within the group communication channel acknowledgement signal;
sending a signal indicating that a group communication channel has been established to the originating device; and
sending the target geographical location data for the target device to the originating device via the preferred mechanism.

74. The method of claim 73, further comprising:
receiving, via the group communication channel, originating geographical location data for the originating device; and
sending the originating geographical location data for the originating device to the target device.

75. The method of claim 74, wherein receiving, via the group communication channel, originating geographical location data for the originating device comprises:
receiving a floor request from the originating device;
sending a floor grant message to the originating device; and
receiving the originating geographical location data for the originating device after sending the floor grant message.

76. The method of claim 75, wherein the originating geographical location data is received through a floor control mechanism used for sharing both the originating geographical location data and voice data.

77. The method of claim 75, wherein the originating geographical location data is received through a floor control mechanism used solely for sharing the originating geographical location data.

78. The method of claim 74, wherein sending the originating geographical location data for the originating device to the target device comprises sending the originating geographical location data for the originating device to the target device based on a flag of the target device indicating a preferred mechanism for receiving the originating geographical location data.

79. The method of claim 73, further comprising:
receiving originating geographical location data for the originating device from the originating device embedded within a floor request message.

80. The method of claim 73, wherein receiving a group communication channel setup request from an originating device over a half-duplex communication channel comprises:
receiving the group communication channel setup request from the originating device over the half-duplex communication channel, with the originating geographical location data for the originating device embedded within the group communication channel setup request.

81. A non-transitory processor-readable storage medium having stored thereon processor-executable instructions configured to cause a processor to perform operations comprising:
receiving a flag from an originating device indicating a preferred mechanism for receiving geographical location data;
receiving a group communication channel setup request from the originating device over a half-duplex communication channel;
sending the group communication channel setup request to a target device with a request for target geographical location data for the target device embedded within the group communication channel setup request;
receiving a group communication channel acknowledgement signal from the target device, with the target geographical location data for the target device embedded within the group communication channel acknowledgement signal;
sending a signal indicating that a group communication channel has been established to the originating device; and
sending the target geographical location data for the target device to the originating device via the preferred mechanism.

82. The non-transitory processor-readable storage medium of claim 81, wherein the stored processor-executable instructions are configured to cause a processor to perform operations further comprising:
receiving, via the group communication channel, originating geographical location data for the originating device; and
sending the originating geographical location data for the originating device to the target device.

83. The non-transitory processor-readable storage medium of claim 82, wherein the stored processor-executable instructions are configured to cause a processor to perform operations such that receiving, via the group communication channel, originating geographical location data for the originating device comprises:

receiving a floor request from the originating device;
sending a floor grant message to the originating device; and
receiving the originating geographical location data for the originating device after sending the floor grant message.

84. The non-transitory processor-readable storage medium of claim 83, wherein the stored processor-executable instructions are configured to cause a processor to perform operations such that the originating geographical location data is received through a floor control mechanism used for sharing both the originating geographical location data and voice data.

85. The non-transitory processor-readable storage medium of claim 83, wherein the stored processor-executable instructions are configured to cause a processor to perform operations such that the originating geographical location data is received through a floor control mechanism used solely for sharing the originating geographical location data.

86. The non-transitory processor-readable storage medium of claim 82, wherein the stored processor-executable instructions are configured to cause a processor to perform operations such that sending the originating geographical location data for the originating device to the target device comprises sending the originating geographical location data for the originating device to the target device based on a flag of the target device indicating a preferred mechanism for receiving the originating geographical location data.

87. The non-transitory processor-readable storage medium of claim 81, wherein the stored processor-executable instructions are configured to cause a processor to perform operations further comprising:
receiving originating geographical location data for the originating device from the originating device embedded within a floor request message.

88. The non-transitory processor-readable storage medium of claim 81, wherein the stored processor-executable instructions are configured to cause a processor to perform operations such that receiving a group communication channel setup request from an originating device over a half-duplex communication channel comprises:
receiving the group communication channel setup request from the originating device over the half-duplex communication channel, with the originating geographical location data for the originating device embedded within the group communication channel setup request.

89. A group communication server, comprising:
means for receiving a flag from an originating device indicating a preferred mechanism for receiving geographical location data;
means for receiving a group communication channel setup request from the originating device over a half-duplex communication channel;
means for sending the group communication channel setup request to a target device with a request for target geographical location data for the target device embedded within the group communication channel setup request;
means for receiving a group communication channel acknowledgement signal from the target device, with the target geographical location data for the target device embedded within the group communication channel acknowledgement signal;
means for sending a signal indicating that a group communication channel has been established to the originating device; and
means for sending the target geographical location data for the target device to the originating device via the preferred mechanism.

90. The group communication server of claim 89, further comprising:
means for receiving, via the group communication channel, originating geographical location data for the originating device; and
means for sending the originating geographical location data for the originating device to the target device.

91. The group communication server of claim 90, means for wherein receiving, via the group communication channel, originating geographical location data for the originating device comprises:
means for receiving a floor request from the originating device;
means for sending a floor grant message to the originating device; and
means for receiving the originating geographical location data for the originating device after sending the floor grant message.

92. The group communication server of claim 91, wherein the originating geographical location data is received through a floor control mechanism used for sharing both the originating geographical location data and voice data.

93. The group communication server of claim 91, wherein the originating geographical location data is received through a floor control mechanism used solely for sharing the originating geographical location data.

94. The group communication server of claim 90, wherein means for sending the originating geographical location data for the originating device to the target device comprises means for sending the originating geographical location data for the originating device to the target device based on a flag of the target device indicating a preferred mechanism for receiving the originating geographical location data.

95. The group communication server of claim 89, further comprising:
means for receiving originating geographical location data for the originating device from the originating device embedded within a floor request message.

96. The group communication server of claim 89, wherein means for receiving a group communication channel setup request from an originating device over a half-duplex communication channel comprises:
means for receiving the group communication channel setup request from the originating device over the half-duplex communication channel, with the originating geographical location data for the originating device embedded within the group communication channel setup request.

97. A method for sending target geographical location data for a target device, comprising:
receiving a flag from an originating wireless device indicating a preferred mechanism for receiving geographical location data;
establishing a half-duplex group communication channel between a target wireless device and the originating wireless device;
receiving the target geographical location data for the target device via the half-duplex group communication channel; and
sending the target geographical location data for the target device to the originating wireless device via the preferred mechanism.

98. The method of claim 97, wherein receiving target geographical location data for the target device via the half-duplex group communication channel comprises:

receiving a floor request from the target wireless device;
sending a floor grant message to the target wireless device; and
receiving the target geographical location data for the target wireless device after sending the floor grant message.

99. The method of claim 98, wherein the target geographical location data is received through a floor control mechanism used for sharing both the target geographical location data and voice data.

100. The method of claim 98, wherein the target geographical location data is received through a floor control mechanism used solely for sharing the target geographical location data.

101. A group communication server, comprising:
a memory; and
a processor coupled to the memory, wherein the processor is configured with processor-executable instructions to perform operations comprising:
receiving a flag from an originating wireless device indicating a preferred mechanism for receiving geographical location data;
establishing a half-duplex group communication channel between a target wireless device and the originating wireless device;
receiving target geographical location data for the target wireless device via the half-duplex group communication channel; and
sending the target geographical location data for the target wireless device to the originating wireless device via the preferred mechanism.

102. The group communication server of claim 101, wherein the processor is configured with software instructions to perform operations receiving target geographical location data for the target wireless device via the half-duplex group communication channel comprises:
receiving a floor request from the target wireless device;
sending a floor grant message to the target wireless device; and
receiving the target geographical location data for the target wireless device after sending the floor grant message.

103. The group communication server of claim 102, wherein the processor is configured with software instructions to perform operations the target geographical location data is received through a floor control mechanism used for sharing both the target geographical location data and voice data.

104. The group communication server of claim 102, wherein the processor is configured with software instructions to perform operations the target geographical location data is received through a floor control mechanism used solely for sharing the target geographical location data.

105. A group communication server, comprising:
means for receiving a flag from an originating wireless device indicating a preferred mechanism for receiving geographical location data;
means for establishing a half-duplex group communication channel between a target wireless device and the originating wireless device;
means for receiving target geographical location data for the target wireless device via the half-duplex group communication channel; and
means for sending the target geographical location data for the target wireless device to the originating wireless device via the preferred mechanism.

106. The group communication server of claim 105, wherein means for receiving target geographical location data for the target wireless device via the half-duplex group communication channel comprises:
means for receiving a floor request from the target wireless device;
means for sending a floor grant message to the target wireless device; and
means for receiving the target geographical location data for the target wireless device after sending the floor grant message.

107. The group communication server of claim 106, wherein the target geographical location data is received through a floor control mechanism used for sharing both the target geographical location data and voice data.

108. The group communication server of claim 106, wherein the target geographical location data is received through a floor control mechanism used solely for sharing the target geographical location data.

109. A group communication server, comprising:
a memory; and
a processor coupled to the memory, wherein the processor is configured with software instructions to perform operations comprising:
receiving a flag from a target wireless device indicating a preferred mechanism for receiving geographical location data;
establishing a half-duplex group communication channel between the target wireless device and an originating wireless device;
receiving originating geographical location data for the originating wireless device via the half-duplex group communication channel; and
sending the originating geographical location data for the originating wireless device to the target wireless device via the preferred mechanism.

110. A method for sending originating geographical location data for an originating wireless device, comprising:
receiving a flag from a target wireless device indicating a preferred mechanism for receiving geographical location data;
establishing a half-duplex group communication channel between the target wireless device and the originating wireless device;
receiving the originating geographical location data for the originating wireless device via the half-duplex group communication channel; and
sending the originating geographical location data for the originating wireless device to the target wireless device via the preferred mechanism.

111. A non-transitory computer readable storage medium having stored thereon processor executable instructions configured to cause a processor to perform operations, comprising:
receiving a flag from a target wireless device indicating a preferred mechanism for receiving geographical location data;
establishing a half-duplex group communication channel between the target wireless device and an originating wireless device;
receiving originating geographical location data for the originating wireless device via the half-duplex group communication channel; and
sending the originating geographical location data for the originating wireless device to the target wireless device via the preferred mechanism.

112. A method for establishing a group communication channel on a wireless device, comprising:
- storing originating geographical location data for the wireless device in memory;
- sending a flag to a group communication server indicating a preferred mechanism for receiving geographical location data;
- sending, via a wireless signal, a group communication channel setup request to the group communication server, with information that identifies a target device and the originating geographical location data for the wireless device embedded within the group communication channel setup request;
- receiving a signal over a half-duplex group communication channel indicating that the group communication channel has been established; and
- receiving target geographical location data for the target device via the preferred mechanism.

113. The method of claim 112, further comprising:
- displaying the target geographical location data for the target device.

114. The method of claim 112, wherein receiving target geographical location data for the target device via the preferred mechanism comprises:
- receiving, via the group communication channel, the target geographical location data for the target device; and
- displaying the target geographical location data for the target device.

115. The method of claim 112, wherein receiving target geographical location data for the target device via the preferred mechanism comprises:
- receiving a signal indicating that the target device has a floor, with the target geographical location data for the target device embedded within the signal indicating that the target device has the floor.

116. The method of claim 112, wherein receiving a signal over a half-duplex group communication channel indicating that a group communication channel has been established comprises receiving an INVITE message indicating that the group communication channel has been opened.

117. A wireless device, comprising:
- means for storing originating geographical location data for the wireless device in memory;
- means for sending a flag to a group communication server indicating a preferred mechanism for receiving geographical location data;
- means for sending, via a wireless signal, a group communication channel setup request to the group communication server, with information that identifies a target device and the originating geographical location data for the wireless device embedded within the group communication channel setup request;
- means for receiving a signal over a half-duplex group communication channel indicating that a group communication channel has been established; and
- means for receiving target geographical location data for the target device via the preferred mechanism.

118. The wireless device of claim 117, further comprising:
- means for displaying the target geographical location data for the target device.

119. The wireless device of claim 117, wherein means for receiving target geographical location data for the target device via the preferred mechanism comprises:
- means for receiving, via the group communication channel, the target geographical location data for the target device; and
- means for displaying the target geographical location data for the target device.

120. The wireless device of claim 117, wherein means for receiving target geographical location data for the target device via the preferred mechanism comprises:
- means for receiving a signal indicating that the target device has a floor, with the target geographical location data for the target device embedded within the signal indicating that the target device has the floor.

121. The wireless device of claim 117, wherein means for receiving a signal over a half-duplex group communication channel indicating that a group communication channel has been established comprises means for receiving an INVITE message indicating that the group communication channel has been opened.

122. A non-transitory computer readable storage medium having stored thereon processor executable instructions configured to cause a processor to perform operations comprising, comprising:
- storing originating geographical location data for a wireless device in memory;
- sending a flag to a group communication server indicating a preferred mechanism for receiving geographical location data;
- sending, via a wireless signal, a group communication channel setup request to the group communication server, with information that identifies a target device and the originating geographical location data for the wireless device embedded within the group communication channel setup request;
- receiving a signal over a half-duplex group communication channel indicating that a group communication channel has been established; and
- receiving target geographical location data for the target device via the preferred mechanism.

123. The non-transitory computer readable storage medium of claim 122, wherein the stored processor executable instructions are configured to cause the processor to perform operations further comprising:
- displaying the target geographical location data for the target device.

124. The non-transitory computer readable storage medium of claim 122, wherein the stored processor executable instructions are configured to cause the processor to perform operations such that receiving target geographical location data for the target device via the preferred mechanism comprises:
- receiving, via the group communication channel, the target geographical location data for the target device; and
- displaying the target geographical location data for the target device.

125. The non-transitory computer readable storage medium of claim 122, wherein the stored processor executable instructions are configured to cause the processor to perform operations such that receiving the target geographical location data for the target device via the preferred mechanism comprises:
- receiving a signal indicating that the target device has a floor, with the target geographical location data for the target device embedded within the signal indicating that the target device has the floor.

126. The non-transitory computer readable storage medium of claim 122, wherein the stored processor executable instructions are configured to cause the processor to perform operations such that receiving a signal over a half-duplex group communication channel indicating that a group communication channel has been established comprises receiving an INVITE message indicating that the group communication channel has been opened.

127. A method for receiving geographical location data on an originating wireless device, comprising:
sending a flag to a group communication server indicating a preferred mechanism for receiving geographical location data;
sending a group communication channel setup request to the group communication server over a half-duplex communication channel, with information that identifies a target wireless device embedded within the group communication channel setup request; and
receiving target geographical location data for the target wireless device from the group communication server via the preferred mechanism.

128. The method of claim 127, further comprising:
sending a floor request message to the group communication server, with geographic coordinates indicative of a location of an originating wireless device embedded within the floor request message.

129. The method of claim 127, further comprising:
displaying a request for originating geographical location data of the originating wireless device;
receiving input authorizing the request for the originating geographical location data of the originating wireless device; and
sending the originating geographical location data of the originating wireless device to the group communication server.

130. The method of claim 127, further comprising displaying when the target wireless device currently has a floor.

131. The method of claim 127, wherein receiving target geographical location data for the target wireless device from the group communication server via the preferred mechanism comprises receiving the target geographical location data for the target wireless device when the target wireless device has a floor.

132. An originating wireless device, comprising:
a transceiver;
a memory; and
a processor coupled to the transceiver and the memory, wherein the processor is configured with software instructions to perform operations comprising:
sending a flag to a group communication server indicating a preferred mechanism for receiving geographical location data;
sending a group communication channel setup request to the group communication server over a half-duplex communication channel, with information that identifies a target wireless device embedded within the group communication channel setup request; and
receiving target geographical location data for the target wireless device from the group communication server via the preferred mechanism.

133. The originating wireless device of claim 132, wherein the processor is configured with software instructions to perform operations further comprising:
sending a floor request message to the group communication server, with geographic coordinates indicative of a location of an originating wireless device embedded within the floor request message.

134. The originating wireless device of claim 132, wherein the processor is configured with software instructions to perform operations further comprising:
displaying a request for originating geographical location data of an originating wireless device;
receiving input authorizing the request for the originating geographical location data of the originating wireless device; and
sending the originating geographical location data of the originating wireless device to the group communication server.

135. The originating wireless device of claim 132, wherein the processor is configured with software instructions to perform operations further comprising displaying when the target wireless device currently has a floor.

136. The originating wireless device of claim 132, wherein the processor is configured with software instructions to perform operations such that receiving target geographical location data for the target wireless device from the group communication server via the preferred mechanism comprises receiving the target geographical location data for the target wireless device when the target wireless device has a floor.

137. An originating wireless device, comprising:
means for sending a flag to a group communication server indicating a preferred mechanism for receiving geographical location data;
means for sending a group communication channel setup request to the group communication server over a half-duplex communication channel, with information that identifies a target wireless device embedded within the group communication channel setup request; and
means for receiving target geographical location data for the target wireless device from the group communication server via the preferred mechanism.

138. The originating wireless device of claim 137, further comprising:
means for sending a floor request message to the group communication server, with geographic coordinates indicative of a location of an originating wireless device embedded within the floor request message.

139. The originating wireless device of claim 137, further comprising:
means for displaying a request for originating geographical location data of an originating wireless device;
means for receiving input authorizing the request for the originating geographical location data of the originating wireless device; and
means for sending the originating geographical location data of the originating wireless device to the group communication server.

140. The originating wireless device of claim 137, further comprising means for displaying when the target wireless device currently has a floor.

141. The originating wireless device of claim 137, wherein means for receiving target geographical location data for the target wireless device from the group communication server via the preferred mechanism comprises means for receiving the target geographical location data for the target wireless device when the target wireless device has a floor.

142. A wireless device, comprising:
a transceiver;
a memory; and
a processor coupled to the transceiver and the memory, wherein the processor is configured with software instructions to perform operations comprising:
sending a flag to a group communication server indicating a preferred mechanism for receiving geographical location data;
maintaining a group communication channel over a half-duplex communication channel established between the wireless device and a remote wireless device;

receiving geographical location data for the remote wireless device from the group communication server via the preferred mechanism; and displaying the geographical location data.

143. The wireless device of claim 142, wherein the processor is configured with software instructions to perform operations further comprising:
receiving a signal indicating that the remote wireless device has a floor; and
modifying a displayed icon that represents the geographical location data.

144. The wireless device of claim 142, wherein the processor is configured with software instructions to perform operations such that receiving geographical location data for the remote wireless device from the group communication server via the preferred mechanism comprises:
receiving the geographical location data for the remote wireless device via the group communication channel.

145. The wireless device of claim 144, wherein the processor is configured with software instructions to perform operations such that receiving the geographical location data for the remote wireless device via the group communication channel comprises receiving the geographical location data for the remote wireless device when the remote wireless device has a floor.

146. The wireless device of claim 142, wherein the processor is configured with software instructions to perform operations such that receiving geographical location data for the remote wireless device from the group communication server via the preferred mechanism comprises:
receiving the geographical location data for the remote wireless device embedded within a floor grant message.

147. The wireless device of claim 142, wherein the processor is configured with software instructions to perform operations further comprising:
sending the geographical location data for the wireless device via the group communication channel.

148. The wireless device of claim 142, wherein the processor is configured with software instructions to perform operations further comprising:
sending a group communication channel setup request with geographical location data for the wireless device embedded within the group communication channel setup request.

149. A method for displaying geographical location data on a wireless device, comprising:
sending a flag to a group communication server indicating a preferred mechanism for receiving geographical location data;
maintaining a group communication channel over a half-duplex communication channel established between the wireless device and a remote wireless device;
receiving geographical location data for the remote wireless device from the group communication server via the preferred mechanism; and
displaying the geographical location data.

150. The method of claim 149, further comprising:
receiving a signal indicating that the remote wireless device has a floor; and
modifying a displayed icon that represents the geographical location data.

151. The method of claim 149, wherein receiving geographical location data for the remote wireless device from the group communication server via the preferred mechanism comprises:
receiving the geographical location data for the remote wireless device via the group communication channel.

152. The method of claim 151, wherein receiving the geographical location data for the remote wireless device via the group communication channel comprises receiving the geographical location data for the remote wireless device when the remote wireless device has a floor.

153. The method of claim 149, wherein receiving geographical location data for the remote wireless device from the group communication server via the preferred mechanism comprises:
receiving the geographical location data for the remote wireless device embedded within a floor grant message.

154. The method of claim 149, further comprising:
sending the geographical location data for the wireless device via the group communication channel.

155. The method of claim 149, further comprising:
sending a group communication channel setup request with geographical location data for the wireless device embedded within the group communication channel setup request.

156. A non-transitory computer readable storage medium having stored thereon processor executable instructions configured to cause a processor to perform operations comprising:
sending a flag to a group communication server indicating a preferred mechanism for receiving geographical location data;
maintaining a group communication channel over a half-duplex communication channel established between a wireless device and a remote wireless device;
receiving geographical location data for the remote wireless device from the group communication server via the preferred mechanism; and
displaying the geographical location data.

157. The non-transitory computer readable storage medium of claim 156, wherein the stored processor executable instructions are configured to cause the processor to perform operations further comprising:
receiving a signal indicating that the remote wireless device has a floor; and
modifying a displayed icon that represents the geographical location data.

158. The non-transitory computer readable storage medium of claim 156, wherein the stored processor executable instructions are configured to cause the processor to perform operations such that receiving geographical location data for the remote wireless device from the group communication server via the preferred mechanism comprises:
receiving the geographical location data for the remote wireless device via the group communication channel.

159. The non-transitory computer readable storage medium of claim 158, wherein the stored processor executable instructions are configured to cause the processor to perform operations such that receiving the geographical location data for the remote wireless device via the group communication channel comprises receiving the geographical location data for the remote wireless device when the remote wireless device has a floor.

160. The non-transitory computer readable storage medium of claim 156, wherein the stored processor executable instructions are configured to cause the processor to perform operations such that receiving geographical location data for the remote wireless device from the group communication server via the preferred mechanism comprises:
receiving the geographical location data for the remote wireless device embedded within a floor grant message.

161. The non-transitory computer readable storage medium of claim 156, wherein the stored processor executable instructions are configured to cause the processor to perform operations further comprising:

sending the geographical location data for the wireless device via the group communication channel.

162. The non-transitory computer readable storage medium of claim 156, wherein the stored processor executable instructions are configured to cause the processor to perform operations further comprising:

sending a group communication channel setup request with geographical location data for the wireless device embedded within the group communication channel setup request.

163. A method for granting access to geographical location data with a wireless device:

sending a flag to a group communication server indicating a preferred mechanism for receiving geographical location data;

sending geographical location data from the wireless device over a half-duplex communication channel to the group communication server that is configured to selectively grant access to the geographical location data from the wireless device during a group communication session by embedding the geographical location data from the wireless device within a floor control message;

sending a signal from the wireless device granting access to a specific remote wireless device to the geographical location data from the wireless device via a group communication channel opened between the wireless device and the specific remote wireless device; and receiving geographical location data for the specific remote wireless device from the group communication server via the preferred mechanism.

164. A wireless device, comprising:

a transceiver;

a memory; and a processor coupled to the transceiver and the memory, wherein the processor is configured with software instructions to perform operations comprising:

sending a flag to a group communication server indicating a preferred mechanism for receiving geographical location data;

sending geographical location data from the wireless device over a half-duplex communication channel to the group communication server that is configured to selectively grant access to the geographical location data from the wireless device during a group communication session by embedding the geographical location data from the wireless device within a floor control message;

sending a signal from the wireless device granting access to a specific remote wireless device to the geographical location data from the wireless device via a group communication channel opened between the wireless device and the specific remote wireless device; and receiving geographical location data for the specific remote wireless device from the group communication server via the preferred mechanism.

165. A wireless device, comprising:

means for sending a flag to a group communication server indicating a preferred mechanism for receiving geographical location data;

means for sending geographical location data from the wireless device over a half-duplex communication channel to the group communication server that is configured to selectively grant access to the geographical location data from the wireless device during a group communication session by embedding the geographical location data from the wireless device within a floor control message;

means for sending a signal from the wireless device granting access to a specific remote wireless device to the geographical location data from the wireless device via a group communication channel opened between the wireless device and the specific remote wireless device; and means for receiving geographical location data for the specific remote wireless device from the group communication server via the preferred mechanism.

\* \* \* \* \*